(12) United States Patent
Walsh et al.

(10) Patent No.: US 11,066,186 B2
(45) Date of Patent: Jul. 20, 2021

(54) RECEIVING APPLIANCE FOR AUTOMATED DELIVERIES

(71) Applicants: Ryan Walsh, Aurora, IL (US); Alex J. Falesch, Oswego, IL (US)

(72) Inventors: Ryan Walsh, Aurora, IL (US); Alex J. Falesch, Oswego, IL (US)

(73) Assignee: Valqari Holdings, LLC, Batavia, IL (US)

( * ) Notice: Subject to any disclaimer, the term of this patent is extended or adjusted under 35 U.S.C. 154(b) by 605 days.

(21) Appl. No.: 15/854,584

(22) Filed: Dec. 26, 2017

(65) Prior Publication Data
US 2018/0105289 A1    Apr. 19, 2018

Related U.S. Application Data

(63) Continuation-in-part of application No. 14/587,828, filed on Dec. 31, 2014, now Pat. No. 10,124,912.
(Continued)

(51) Int. Cl.
*B64F 1/00*       (2006.01)
*B64F 1/32*       (2006.01)
(Continued)

(52) U.S. Cl.
CPC ............. *B64F 1/32* (2013.01); *A47G 29/141* (2013.01); *B60L 53/12* (2019.02); *B60L 53/30* (2019.02);
(Continued)

(58) Field of Classification Search
CPC ............ A47G 29/141; A47G 2029/145; A47G 2029/146; A47G 2029/147; B60L 53/12;
(Continued)

(56) References Cited

U.S. PATENT DOCUMENTS

| | | | |
|---|---|---|---|
| 2,900,046 | A | 8/1959 | Bailey |
| 4,706,407 | A | 11/1987 | Melton |

(Continued)

FOREIGN PATENT DOCUMENTS

| | | |
|---|---|---|
| CN | 2857710 Y | 1/2007 |
| CN | 102067183 A | 5/2011 |

(Continued)

OTHER PUBLICATIONS

Examination Report dated May 9, 2019 in connection with Australian application No. 2018205156.
(Continued)

*Primary Examiner* — Truc M Do
(74) *Attorney, Agent, or Firm* — Cook Alex Ltd.; Ryan M. Truesdale

(57) ABSTRACT

A landing pad receives and stores packages delivered from an aerial vehicle and awaiting pickup from an aerial vehicle. The landing pad can be placed outside of a window and can contain a transmitter for sending out an identification signal via radio frequency to aid aerial vehicles in finding the landing pad. The landing pad contains a landing platform with a trapdoor that leads to a storage compartment. The trapdoor can be configured to only open when it receives a signal from an authorized aerial vehicle. The storage compartment can be accessed via a storage compartment door which can contain a locking mechanism. The storage compartment can be climate controlled. The landing pad can also have a transmitter that emits sounds to discourage animals from nesting on or near the landing pad. The landing pad can also include a solar power generator as a source of electrical energy.

18 Claims, 38 Drawing Sheets

Related U.S. Application Data

(60) Provisional application No. 61/923,207, filed on Jan. 2, 2014, provisional application No. 62/507,133, filed on May 16, 2017, provisional application No. 62/513,430, filed on May 31, 2017.

(51) Int. Cl.

| | | |
|---|---|---|
| *B60L 53/12* | (2019.01) | |
| *B60L 53/68* | (2019.01) | |
| *B60L 53/51* | (2019.01) | |
| *B60L 53/30* | (2019.01) | |
| *A47G 29/14* | (2006.01) | |
| *B64C 39/02* | (2006.01) | |
| *E06B 7/28* | (2006.01) | |
| *E06B 7/32* | (2006.01) | |
| *G06Q 10/10* | (2012.01) | |
| *G06Q 50/28* | (2012.01) | |
| *B60L 53/66* | (2019.01) | |

(52) U.S. Cl.
CPC ............... *B60L 53/51* (2019.02); *B60L 53/68* (2019.02); *B64C 39/024* (2013.01); *B64F 1/007* (2013.01); *E06B 7/28* (2013.01); *E06B 7/32* (2013.01); *G06Q 10/1097* (2013.01); *G06Q 50/28* (2013.01); *A47G 2029/145* (2013.01); *A47G 2029/146* (2013.01); *A47G 2029/147* (2013.01); *B60L 53/665* (2019.02); *B60L 2200/10* (2013.01); *B64C 2201/128* (2013.01)

(58) Field of Classification Search
CPC .......... B60L 53/68; B60L 53/51; B60L 53/30; B60L 53/665; B60L 2200/10; B64F 1/007; B64F 1/32; B64C 39/024; B64C 2201/128; E06B 7/28; E06B 7/32; G06Q 10/1097; G06Q 50/28
See application file for complete search history.

(56) References Cited

U.S. PATENT DOCUMENTS

| | | | |
|---|---|---|---|
| 5,435,484 A | 7/1995 | Carlson | |
| 5,624,071 A | 4/1997 | Sosan | |
| 5,667,136 A | 9/1997 | Chen | |
| 5,774,053 A * | 6/1998 | Porter | G07F 17/12 340/568.1 |
| 5,797,497 A | 8/1998 | Edwards | |
| 5,979,750 A | 11/1999 | Kindell | |
| 6,802,263 B1 | 10/2004 | Kolb | |
| 6,859,005 B2 | 2/2005 | Boliver | |
| 7,023,399 B2 | 4/2006 | Zaretsky et al. | |
| 7,162,330 B2 | 1/2007 | Mayer | |
| 7,854,374 B2 | 12/2010 | Dudley | |
| 8,915,498 B2 | 12/2014 | Hynds | |
| 9,211,025 B1 | 12/2015 | Elhawwashy | |
| 9,840,340 B2 | 12/2017 | O'Toole | |
| 2001/0020619 A1 | 9/2001 | Pfeifer et al. | |
| 2002/0169628 A1 | 11/2002 | Bauer | |
| 2003/0205979 A1 | 11/2003 | Papari et al. | |
| 2005/0230397 A1 | 10/2005 | Yang et al. | |
| 2006/0113368 A1 | 6/2006 | Dudley | |
| 2007/0028506 A1 | 2/2007 | Lester | |
| 2007/0145057 A1 | 6/2007 | Nance | |
| 2007/0257036 A1 | 11/2007 | Nance | |
| 2009/0084836 A1 | 4/2009 | Dudley | |
| 2009/0194532 A1 | 8/2009 | Yang et al. | |
| 2009/0240511 A1* | 9/2009 | Darrouzet | G06Q 10/08 705/1.1 |
| 2010/0012769 A1 | 1/2010 | Alber et al. | |
| 2011/0006060 A1 | 1/2011 | Lin | |
| 2012/0080556 A1 | 4/2012 | Root | |
| 2014/0032034 A1* | 1/2014 | Raptopoulos | G05D 1/0088 701/25 |
| 2015/0102903 A1 | 4/2015 | Wilkinson | |
| 2015/0120094 A1 | 4/2015 | Gur | |
| 2015/0158599 A1 | 6/2015 | Sisko | |
| 2015/0175276 A1 | 6/2015 | Koster | |
| 2016/0033966 A1 | 2/2016 | Farris et al. | |
| 2016/0068277 A1* | 3/2016 | Manitta | B64C 39/024 244/114 R |
| 2016/0235236 A1 | 8/2016 | Byers et al. | |
| 2017/0091710 A1 | 3/2017 | Van Dyke | |

FOREIGN PATENT DOCUMENTS

| | | |
|---|---|---|
| CN | 102611200 A | 7/2012 |
| CN | 202476330 U | 10/2012 |
| CN | 202534057 U | 11/2012 |
| CN | 103198425 A | 7/2013 |
| CN | 103263218 A | 8/2013 |
| CN | 103264768 A | 8/2013 |
| CN | 103274047 A | 9/2013 |
| CN | 103274226 A | 9/2013 |
| CN | C103274226 A | 9/2013 |
| CN | 203325087 U | 12/2013 |
| CN | 203350749 U | 12/2013 |
| CN | C203350749 U | 12/2013 |
| CN | 105848533 B | 4/2018 |
| DE | 4435155 A1 | 4/1996 |
| DE | 20201400236 U1 | 2/2014 |
| DE | 202014000236 U1 | 2/2014 |
| GB | 2330382 A | 4/1999 |
| SG | 182025 A | 7/2012 |
| SG | 182025 A1 | 7/2012 |
| WO | 9919591 A1 | 4/1999 |
| WO | WO 9919591 A1 | 4/1999 |
| WO | 2007141795 A1 | 12/2007 |
| WO | WO 2007141795 A1 | 12/2007 |
| WO | 2008153269 A1 | 12/2008 |
| WO | WO 2008153269 A1 | 12/2008 |
| WO | 2012094430 A1 | 7/2012 |
| WO | WO 2012094430 A1 | 7/2012 |
| WO | WO 2012094430 A2 | 7/2012 |
| WO | 2015061008 A1 | 4/2015 |
| WO | WO 2015061008 A1 | 4/2015 |
| WO | 2016094067 A1 | 6/2016 |

OTHER PUBLICATIONS

Extended European Search Report dated Jun. 18, 2018 in connection with European Application No. 17208328.9.
PCT/US2014/073031 filed Dec. 31, 2014.
International Search Report and Written Opinion dated Apr. 17, 2015 ("0417ISR").
International Preliminary Report on Patentability dated Jul. 14, 2016 ("0714IPRP").
U.S. Appl. No. 14/587,828, filed Dec. 31, 2014.
Office Action dated Dec. 19, 2016 ("1219US").
Office Action dated Jun. 28, 2017 ("0628US").
Office Action dated Oct. 5, 2017 ("1005US").
AU App. No. 2014373647 filed on May 25, 2016.
Examination Report No. 1 dated Jan. 9, 2018 ("0109AU").
EP App. No. 14837087.7 filed on May 25, 2016.
Office Action dated Sep. 1, 2017 ("0901EP").
CN App. No. 201480071450.8 filed on Jun. 28, 2016.
Office Action dated May 26, 2017 ("0526CN").
CA App. No. 2,952,582 filed on Dec. 15, 2016.
Office Action dated Jan. 30, 2017 ("0130CA").
Office Action dated May 12, 2017 ("0512CA").
David Gianatasio, What Every House Needs: A Century 21 Branded Landing Pad for Amazon Drones, Adweek, Dec. 6, 2013, Retrieved from the Internet: http://www.adweek.com/adfreak/century-21s-landing-pad-will-helpyou-welcome-amazon-drone-delivery-154341.
International Search Report and Written Opinion dated Apr. 17, 2015 in connection with International Application No. PCT/US2014/073031.

(56) References Cited

OTHER PUBLICATIONS

International Preliminary Report on Patentability dated Jul. 14, 2016 in connection with International Application No. PCT/US2014/073031.
Office Action dated Jan. 30, 2017 in connection with Canadian Application No. 2,952,582.
Office Action dated May 12, 2017 in connection with Canadian Application No. 2,952,582.
Office Action dated May 26, 2017 in connection with Chinese Application No. 201480071450.8.
Office Action dated Sep. 1, 2017 in connection with European Application No. 14837087.7.
Examination Report No. 1 dated Jan. 9, 2018 in connection with Australian Application No. 2014373647.
CN App. No. 201810285497.4.
Office Action dated Mar. 18, 2020 "CNOA0318".
Second Office Action dated Mar. 18, 2020 in connection with Chinese Patent Application No. 201810285497.4.
David Gianatasio, What Every House Needs: A Century 21 Branded Landing Pad for Amazon Drones, Adweek, Dec. 6, 2013, Retrieved from the Internet: http://www.adweek.com/adfreak/century-21s-landing-pad-will-helpyou-welcome-amazon-drone-delivery-154341.
Examination Report dated Dec. 20, 2018 in connection with Australian application No. 2018205156.
Notice of Acceptance dated Apr. 19, 2018 in connection with Australian Application No. 2014373647.
First Office Action dated Aug. 6, 2019 in connection with Chinese Patent Application No. 201810285497.4.
The Office Action dated Oct. 7, 2019 in connection with European Patent Application No. 17208328.9.
PCT/US2018/033059.
International Search Report and Written Opinion dated Sep. 5, 2018 "0905ISR".
U.S. Appl. No. 14/587,828.
Notice of Allowance dated Jul. 30, 2018 "0730US".
Notice of Allowance dated Oct. 11, 2018 "1011US".
U.S. Appl. No. 16/121,174.
Office Action dated Dec. 24, 2020 "USOA20201224".
Office Action dated Dec. 9, 2020 in connection with Australian Patent Application No. 2019283980.
Office Action dated Dec. 9, 2020 in connection with European Patent Application No. 18733018.8.
Third Office Action dated Aug. 28, 2020 in connection with Chinese Patent Application No. 201810285497.4.
First Office Action dated Sep. 30, 2020 in connection with Chinese Patent Application No. 201810285496.X.
International Search Report and Written Opinion dated Sep. 5, 2018 in connection with PCT/US2018/033059.

\* cited by examiner

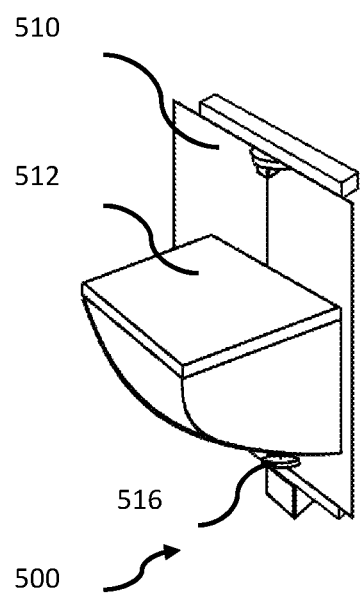 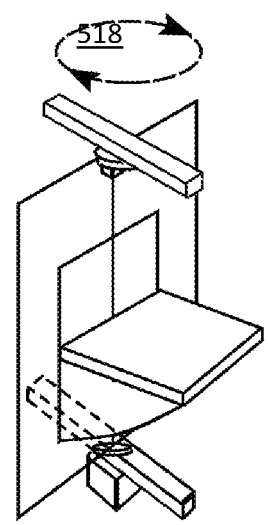 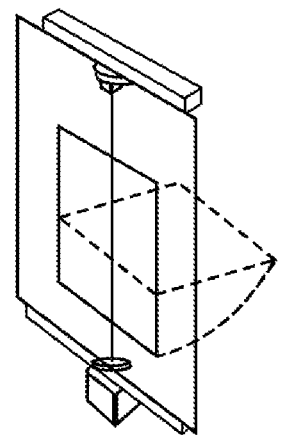
FIG. 24A  FIG. 24B  FIG. 24C

RECEIVING APPLIANCE FOR AUTOMATED DELIVERIES

CROSS-REFERENCE TO RELATED APPLICATIONS

This application is a continuation-in-part of U.S. application Ser. No. 14/587,828 filed on Dec. 31, 2014, entitled "Landing Pad for Unmanned Aerial Vehicle Delivery" which claims priority benefits from U.S. Provisional Application Ser. No. 61/923,207 filed on Jan. 2, 2014, entitled "Landing Pad for Receiving Packages From Unmanned Aerial Vehicles". This application is also related to and claims priority to the '207 application. This application is also related to and claims priority benefit from U.S. Provisional Application Ser. No. 62/507,133 filed on May 16, 2017, entitled "Mail Security Measures for Unmanned Aerial Vehicle Delivery Systems". This application is also related to and claims priority benefit from U.S. Provisional Application Ser. No. 62/513,430 filed on May 31, 2017, entitled "Drone Delivery System and Methods with Status Determination System".

The '828, '207, '133, and 430 applications are hereby incorporated by reference herein in their entireties.

FIELD OF THE INVENTION

The present invention relates to the use of a landing pad and/or parcel receptacle to send/receive packages via unmanned air aerial vehicles, also frequently referred to as drones. One embodiment involves mounting the device in a window so that it can be used by those living in high-rises.

Some embodiments involve security measures for the parcel receiving systems and/or improvements in scheduling drone delivery.

Online or remote shopping has grown immensely over the past decade. Remote shopping offers many benefits including: allowing customers to shop from literally anywhere in the world; eliminating the costs associated of having to ship, store, and sell items from traditional retail store locations; and allowing manufacturers and distributors to reach a larger target market.

However, despite these advantages, remote shopping is not without its drawbacks. Most prominent among such drawbacks is the lag time between purchasing an item and having it delivered. With the exception of digital goods that can be downloaded over the internet, most goods purchased by remote shopping need to be delivered to the purchaser's home or business. This usually takes days, if not weeks, and is subject to the intrinsic costs, hazards and obstacles of traditional parcel delivery. The variability in timeframes and distance is due to the inherent drawbacks of the current logistics and transportation models.

Companies are attempting to minimize the delay between purchase and delivery by offering same day delivery in certain cities. However, this can be costly and inefficient as it requires a large number of individuals on call to deliver items as they are purchased. Not only does this increase the delivery cost, it also increases traffic congestion and carbon emissions, as there are more people out making deliveries.

One suggestion in improved delivery service that does not have the draw backs of conventional same day delivery, is the use of unmanned aerial vehicles/drones. Low flying drones, such as quadcopters and octocopters, can be used to carry and deliver small to medium sized parcels/packages, directly to known locations, using global positioning system technology, telemetry, metadata and/or commands from a remote operator. Once purchased, these drones promise to be more cost effective than human delivery, and will likely be faster as they can bypass traffic and are not limited to following paved roads.

Drones can include unmanned ground vehicles and unmanned aerial vehicles.

As consumer demand for same day delivery rises, drones are rapidly becoming a viable technology for many delivery services and companies. Companies implementing drones will reach a greater market with less overhead and lower costs than companies using conventional delivery methods.

Despite its many advantages, one of the potential problems of using drones to deliver packages is that their use will increase package theft. This problem arises from the fact that drones are visible from the ground and typically have shorter ranges than traditional truck delivery. Potential thieves will be able to follow drones to their destination and steal the package after it has been left at the recipient's doorstep.

Another problem with using drones to deliver packages arises when the destination for the package is an area with a high density population. In an area with high-rises housing thousands of tenants and busy streets, packages simply cannot be left in front of buildings. Not only would this encourage theft, but it would also create a public safety hazard as doors and streets would quickly become blocked. Currently this problem is dealt with by having a doorman for a building accept packages for the building's tenants. However, this current setup will not work with drones, as drones are incapable of opening doors or ringing bells.

Another issue in utilizing drones for package delivery is that obstacles, such as low hanging branches or covered porches, can make it impractical if not impossible to deliver goods to the ground level, and will create a myriad of variables that could lead to either more expensive delivery due to the increased need for sensors on the drones, or prevent certain areas from being capable of receiving deliveries. Many of these problems will not be known until the drone reaches the delivery location, further compounding the problem.

With Amazon announcing a standardized form of drone delivery with Amazon PrimeAir, other delivery services will soon begin adopting the new form of delivery.

Several companies have begun production on parcel receiving devices, such as landing pads, to meet the coming demand for secure locations for drone delivery, particularly in congested urban areas.

With the ability to revolutionize the delivery service, it is imperative that the proper infrastructure is developed to ensure the successful implementation of drone delivery. What is needed is a device that accepts packages from a drone and is secure from potential thieves.

There is room in the art for delivery system that have abilities, such as but not limited to, the ability to sort deliveries for multiple users into separate compartments, scan deliveries for potentially hostile substances, customize their openings to accommodate the size of the parcel(s) being delivered, and/or have the option to be less intrusive on a building's façade.

There is also room in the art for methods to optimize, or at least improve, interactions between drones, parcels, and receptacles, such that issues, such as scheduling conflicts and capacity problems arising from the use of drones and parcel receiving mechanisms are minimized, if not eliminated.

SUMMARY OF THE INVENTION

A parcel container, such as a landing pad can be used to improve deliveries. A landing pad with a secure storage compartment or box can be used to provide a convenient and safe place for drones to deliver and/or pick up packages. The landing pad can be configured to fit into a standard window, so that it is more accessible to drones, and less accessible to thieves. The landing pad can also be configured to stand alone, either on a rooftop or in a field.

The drone landing pad can be secured to a standard sized window similar to an adjustable window based air conditioning unit. In some embodiments, the landing pad can have some adjustability to meet a larger variety of window sizes. The portion that faces into the building can have the digital interface as well as the door to the lockable compartment. The landing pad then protrudes from the window towards the outside; creating a platform for the drone to land as well as to secure the package once it is delivered and/or before it is picked up.

The method in which the landing pad is mounted to the building includes, but is not limited to: brackets; adhesives; magnets; or other methods of securing the landing pad to the building. With many large buildings and condominium/apartment developments having stringent rules and codes concerning the application of exterior hardware, the method of mounting and securing the pad to the window can have the options listed above to allow the maximum number of people to benefit from this technology.

In some embodiments, the landing pad utilizes a window mounted system. In at least some window mounted systems, such as that shown in FIG. 35, at least one wing can be built into the side that can extend to create a secure exterior surface and fully fill the open portion of the window. The wings can be extended to fill gaps between the mailbox and the window frame. In some embodiments, the landing pad is sized to fit a particular window size. In some embodiments, the landing pad is adjustable to fit a variety of window sizes.

In some embodiments, the landing pad would be fixable and lockable from the inside. This lockability can come with an appropriate lock and key mechanism to prevent tampering if located in a common or public area. In some embodiments, a frame can connect to the mounting system to be used as a combination device for the dual purpose of secure mounting and building security. In some embodiments, a vertical brace can extend to the upper surface of the frame. In some embodiments, the vertical brace prevents, or at least reduces the chance of, the window opening.

In some embodiments, the landing pad utilizes a mailbox system to mount the pad to existing mailboxes. In some embodiments, the landing pad utilizes a balcony mounting system that utilizes a balcony brace and/or a balcony mount. Some embodiments can be secured to the floor and/or lower surface of the balcony. Some embodiments can also be secured to the banister, guardrail or railing of the balcony. In some embodiments, the landing pad can be attached and/or supported to the outer exterior surface of the balcony.

In some embodiments, the outside surface(s) of the landing pad can contain LED or other display panel(s). This allows the landing pads to display information such as clocks, advertisements, and/or be decorative features. In some embodiments, multiple landing pads can be placed on the same building and networked together to create visual designs, much like high-rise buildings often black out certain windows to form words and/or designs.

Power for the landing pad can come from solar energy, battery energy, electricity from a wall outlet, or any other method of delivering energy including but not limited to combinations of the listed power sources.

In some embodiments, the landing pad can act as a charging station for the air drone. Various methods for changing the drone could be used including inductive charging, and/or directly allowing the drone to plug into the landing pad. By allowing drones to charge at the landing pad, drones will be able to make longer trips and/or carry heavier loads.

In one embodiment, the landing pad contains a transmitter that transmits, via radio frequency, a unique ID to help a drone identify it. After identifying the landing pad, the drone proceeds to the landing platform, which extends from a window, lands and releases its package. The landing pad, receiving a signal from the drone that the package has been delivered, opens a trapdoor on the landing platform so that the package can enter a storage compartment. In an alternative embodiment, the trapdoor is opened before the package is actually delivered, to lessen the chance that it is dislodged or removed, from the secure location within the landing platform.

A storage door, located on the landing pad opens into the building and allows access to the storage compartment. In some embodiments, the storage door includes a lock to lessen the chance that the package is stolen. The lock can be accessible through digital means such as pass code, pin or biometric scanning such as finger print recognition or retinal scan; or the lock can be accessible through mechanical means such as a key. Opening of the secured storage compartment can occur through the device itself, or can be opened remotely such as through a smart phone based application that can remotely configure, secure, or open the device.

One optional feature that can be included in the design and method of the device is the option to notify the recipient of the package's arrival through the means of text message or email notification in addition to the signal on the device itself or integrated into a home smart system.

Another optional feature is that the landing pad can be climate controlled. Various elements of the storage compartment that can be controlled include, but are not limited to, the temperature, humidity, and light settings. Traditional climate control mechanisms, including air-conditioners, electric and gas heaters, infrared heaters, dehumidifiers and/or humidifiers can be used. In some embodiments various insulating materials can be used to make the landing pad more efficient.

In at least one embodiment, the landing pad can be configured to change the climate of its storage box based on the item being dropped off and/or picked up. For example, in some instances if an item that should be kept warm is being dropped off, such as a pizza, the landing pad can be configured to keep the storage box warm so the item is ready when the individual gets home. Similarly, when an item that should be kept cool, such as certain medications, is being dropped off the storage box can be kept cool. In other or the same embodiments, the storage box can receive information about the item being dropped off from a variety of sources including, but not limited to, the user, a network, and/or the drone.

In some embodiments, the landing pad can be configured to adjust the climate based on user input. For example, in one embodiment, refrigerated food can be dropped off during the morning when an individual is at work. The landing pad, having received the food, can keep the food refrigerated until the user gets home, or the user tells the landing pad, either via a physical signal and/or electrical signal that the landing pad should heat up the food. In this way, refrigerated food can be delivered, stored, and cooked before the individual arrives home.

In some embodiments the landing pad can be configured to reduce wind resistance so as to prevent it from becoming detached during strong winds. In other or the same embodiments, the landing pad can be configured to fold into the window when not in use to minimize wind resistance.

The landing pad can be made of various materials, including but not limited to, aluminum, stainless steel, carbon fiber, and other rust resistant materials. The interior of the storage compartment can be made of a bacteria resistant material to prevent mold growth and to keep food sanitary.

In some embodiments, the parcel container can contain at least one scanner and/or scanner array, a camera and/or camera array, a multi-vault system, a multi-part diaphragm door, and/or a rotating hideaway system.

At least one scanner and/or array of scanners can include a singular unit or sensor array, which can be linked to a central processor and/or a single interface. Power can be provided by an electrical supply. In some embodiments, the system can include a backup battery for supplemental power, particularly in emergency situations.

Scanners can be selected from a variety of conventional scanners, such as Geiger counters to detect nuclear materials. Scanners can also be selected to detect a myriad of various biological or chemical agents. In some embodiments, explosives, narcotics, and drugs can be scanned for.

These scanners allow buildings, including government facilities and corporate offices, to scan a delivery prior to accepting it to determine if it is safe to bring into the building. The scanners can also be used to detect potentially dangerous materials or hazardous contents that are banned in many locations such as deliveries to a prison.

A security camera and camera detection system can comprise an array of cameras. Some camera placements include a rearward facing camera and/or a frontward facing camera, depending on the embodiment of a landing pad.

In some embodiments, there can be at least one camera on the top of the platform facing forward, backward, left, right, upward, downward, or a full 360 degrees. There can also be a camera located in the internal chamber of the landing pad. This camera can monitor the internal mechanisms and contents of deliveries and can also be used in a two-stage verification process. In some embodiments, this camera can read visual identifiers such as QR codes, UPC codes, or other individual visual identifiers on the exterior of the parcel.

In at least some embodiments, at least one exterior camera can be used to detect incoming unmanned aerial vehicles and/or for security purposes. In some embodiments, the camera(s) can detect anomalous objects on the platform such as parcels that were not delivered properly and/or animals nesting on the pad. In some embodiments, the exterior camera(s) can be part of a two-party visual verification system.

A multi-vault system can comprise a single landing area for an unmanned aerial vehicle. In some embodiments, the multi-vault system includes at least one exterior trapdoor. In some embodiments, a sorting mechanism is located underneath the trapdoor. In some embodiments, the sorting mechanism can sort parcels according to data provided through an internet connection, tags on the parcels themselves, through a signal received from the delivering drone, and/or other methods.

In some embodiments, a multi-part diaphragm door that operates similarly to the aperture of a camera, allows for the landing pad to open wide enough for a parcel of a specified size, without opening far enough for foreign objects or thieves to come into contact with items inside.

In some embodiments, a rotating hideaway system can sit flush or close to flush with a wall, without creating an unobtrusive silhouette. As an unmanned aerial vehicle is arriving (which in some embodiments can be detected by a rear facing camera), the rotating hideaway system can revolve to reveal a landing pad with a vault system.

In some embodiments, a method and system for determining the status of a parcel, a parcel receptacle and/or drone can, among other things, minimize, or at least reduce, collisions between drones delivering to a parcel receptacle, conflicts of parcels being left in parcel receptacles, average parcel delivery time and/or drone energy use.

A drone delivery system (DDS) can comprise a drone, a parcel receptacle, and/or a parcel. In at least some embodiments the status of the drone and/or the status of a parcel receptacle is sent to a central location.

Information about a parcel can comprise physical characteristics, such as its dimensions and mass.

Information about a parcel can further comprise physical characteristics of its contents, such as temperature storage information and fragility.

Information about a parcel can further comprise information about its intended recipient and general shipping instructions.

Information about a parcel receptacle can comprise its location, capacity, and expectation of deliveries, as well as special features within the parcel receptacle such as the availability of wireless charging for drones.

Information about a drone or drone fleet can comprise how many drones there are, the carrying capacities of such drones, the locations of such drones, and the scheduled deliveries to be made by such drones.

Further, the DDS can, in some embodiments, use environmental information such as weather patterns, locations of potential charging stations, and legal routes for transportation of parcels to schedule deliveries and determine if a given drone on a given route has the capacity to deliver a given parcel.

In at least some embodiments, the DDS can take into account in-flight battery charging, in-flight battery changes, and/or locations of charging stations (and their current and/or predicted availability) when determining drone ranges.

A landing pad for an unmanned aerial vehicle can include at least one scanner selected from a variety of conventional scanners. The pad can comprise a security camera system having multiple cameras. Some camera placements include a rearward facing camera and/or a frontward facing camera. The cameras can be used to detect incoming unmanned aerial vehicles. In some embodiments, the landing pad can comprise a multi-vault system having a single landing area for an unmanned aerial vehicle with multiple vaults for parcel storage. Some embodiments have a multi-part diaphragm door for parcel reception. Some embodiments have a rotating hideaway feature, exposing the landing pad to the outside of a structure only when a delivery is expected.

A status determination system allows for delivery of parcels by drones to parcel receptacles to reduce collisions, conflicts of parcels being left in parcel receptacles, and/or average delivery time for a delivery. A status determination system can include a drone, a parcel receptacle, and a parcel. Information regarding the drone, the parcel receptacle, and/or the parcel can be collected and proceed by the status determination system. Information can include, among other things the physical characteristics of a parcel and/or its contents, location, capacity, and expectation of deliveries of the parcel receptacle, the carrying capacities of the drone, environmental information such as weather patterns, locations of potential charging stations, and legal routes for transportation of parcels.

BRIEF DESCRIPTION OF THE DRAWINGS

FIG. 24A is a side perspective view of a hideaway landing pad, showing the landing pad hidden on the inside of a structure.
FIG. 24B is a side perspective view of a landing pad, showing a revolving action that moves the hideaway landing pad from the inside of a structure to the outside of the structure.
FIG. 24C is a side perspective view of a hideaway landing pad, showing the hideaway landing pad exposed to the outside of a structure after the revolving action shown by the arrows in FIG. 24B.

DETAILED DESCRIPTION OF ILLUSTRATIVE EMBODIMENT(S)

Figure 1:
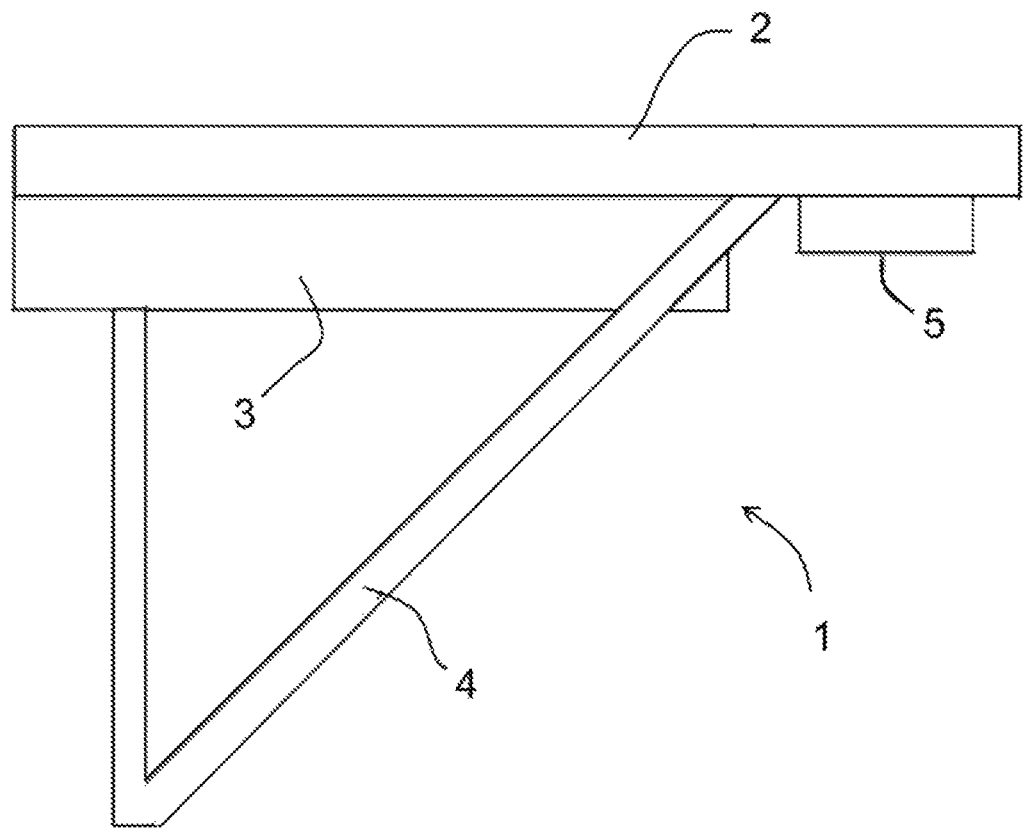
FIG. 1 is a side view of a landing pad.

FIGS. 1, 2, 3 and 4 illustrate various viewpoints of the same landing pad 1.
FIG. 1 is a side view of landing pad 1. Landing pad 1 is designed to be inserted into a window, much like a window air-conditioner with the majority of landing platform 2 and storage compartment 3, protruding out of the window. In this way, a drone can land on landing platform 2 and deposit its package into storage compartment 3. A user can then retrieve the package via storage door 10 (see FIG. 2) which opens into the room.

Landing platform 2 and storage compartment 3 are supported by support brace 4 which can be attached to the exterior of a building. An optional transponder (not shown) can use radio frequency to emit a unique ID corresponding to landing pad 1 to aid the drone, along with GPS, in finding landing pad 1. This transponder can be housed with other electronics in electronic housing 5.

In some embodiments, storage compartment 3 includes a conveyer belt (not shown) which move packages either towards the window (not shown) after they have been delivered and/or away from the window when they are being picked up by the drone. In some embodiments, storage compartment 3 has a hydraulic system that tilts the floor of storage compartment 3 or the entire storage compartment, to help move any packages towards and/or away from the window.

In some embodiments, storage compartment 3 can be expandable to allow for larger packages, while decreasing wind resistance when storage compartment 3 is not in use.

Figure 2:
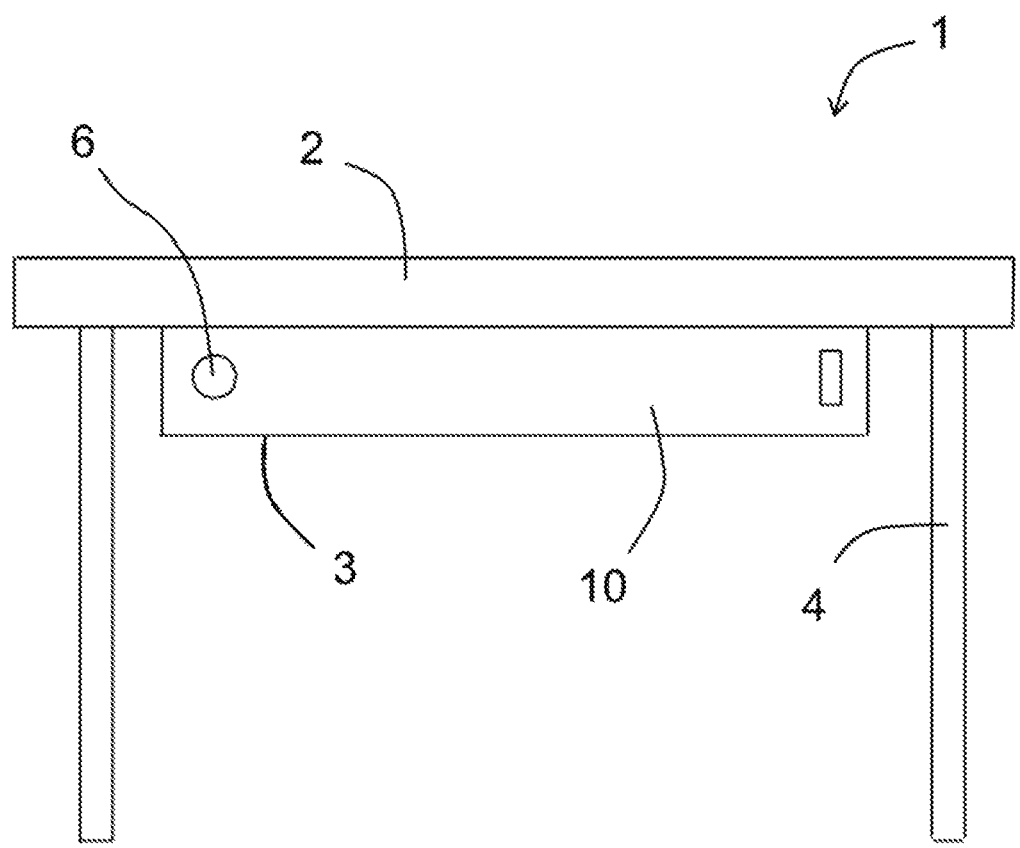
FIG. 2 is a back view of the landing pad in FIG. 1.

FIG. 2 shows a back view of landing pad 1, as would be seen by a user inside the building. Storage door 10 opens into the room, although it could also push into storage compartment 3, and allows for access into storage compartment 3.

An optional lock 6 can be applied to storage door 10 for added security. Lock 6 can be mechanical, electronic or both, and can be opened by a physical object such as a key, keycard, fingerprint (or other biometric identifier), by supplying a secret code such as via a keypad, or voice recognizer, or by a combination of both physical objects and secret codes. Lock 6 is especially useful if landing pad 1 is installed in a window facing a common room, such as a hallway or lobby in an apartment.

One can imagine floors of large skyscrapers being dedicated to drone delivery, in which residents have personal landing pads installed. Individuals can opt for this type of setup if they do not want landing pad 1 blocking the view from their personal window, or if they live too high or too low in a high-rise for effective drone delivery.

Figure 3:
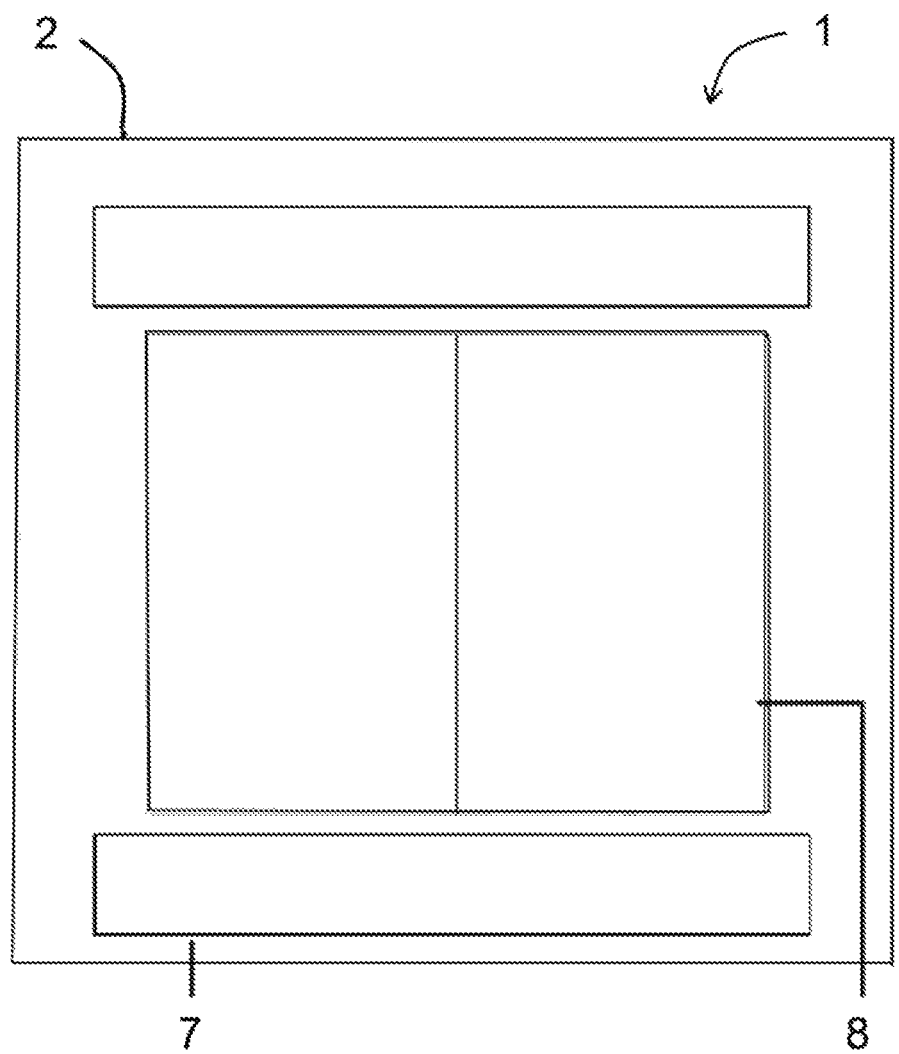
FIG. 3 is top view of the landing pad in FIG. 1.

FIG. 3 is a top view of landing pad 1. It illustrates trapdoor 8 on landing platform 2 which opens into storage compartment 3 when a drone leaves a package on landing platform 1. Trapdoor 8 can be spring loaded and activated via gravity. However, this can cause problems as it could allow animals, such as birds or squirrels to activate trapdoor 8 and find their way into users' homes. Furthermore, lightweight packages may not weigh enough to open trapdoor 8. Finally, if trapdoor 8 is allowed to freely swing open, thieves could easily steal from storage compartment 3, assuming landing pad 1 can be easily accessed.

To alleviate these problems, trapdoor 8 can be configured to be opened only via magnetic and/or mechanical means. In one embodiment, an air drone delivering a package sends a signal to landing pad 1, that the package is on landing platform 2 and it is safe to open trapdoor 8. This signal is received by a receiver (not shown) in electronic housing 5 and trapdoor 8 opens and then closes once the package is inside storage compartment 3.

In some embodiments, the signals being sent between the landing pad and air drones are encrypted to prevent thieves from hacking and replicating them.

FIG. 3 also illustrates optional solar paneling 7. While landing pad 1 can be powered via a myriad of ways, such as traditional electrical wiring running from the house or batteries, solar paneling 7 can be a highly efficient source of power for a variety of reasons. For one, solar paneling 7 will be receiving a full day of sunlight in many situations as it is located outside. Furthermore, landing pad 1 is dormant most of the time, except when sending out a unique ID from a transponder when an air drone is near or being engaged by the user and does not require a substantial amount of power.

Eliminating the need for external power allows for easier installation in areas without an electrical outlet nearby.

Landing pad 1 can also include a device in electric housing 5 that transmits a frequency that deters animals away from landing pad 1. This would keep animals from nesting on or near landing pad 1.

Figure 4:
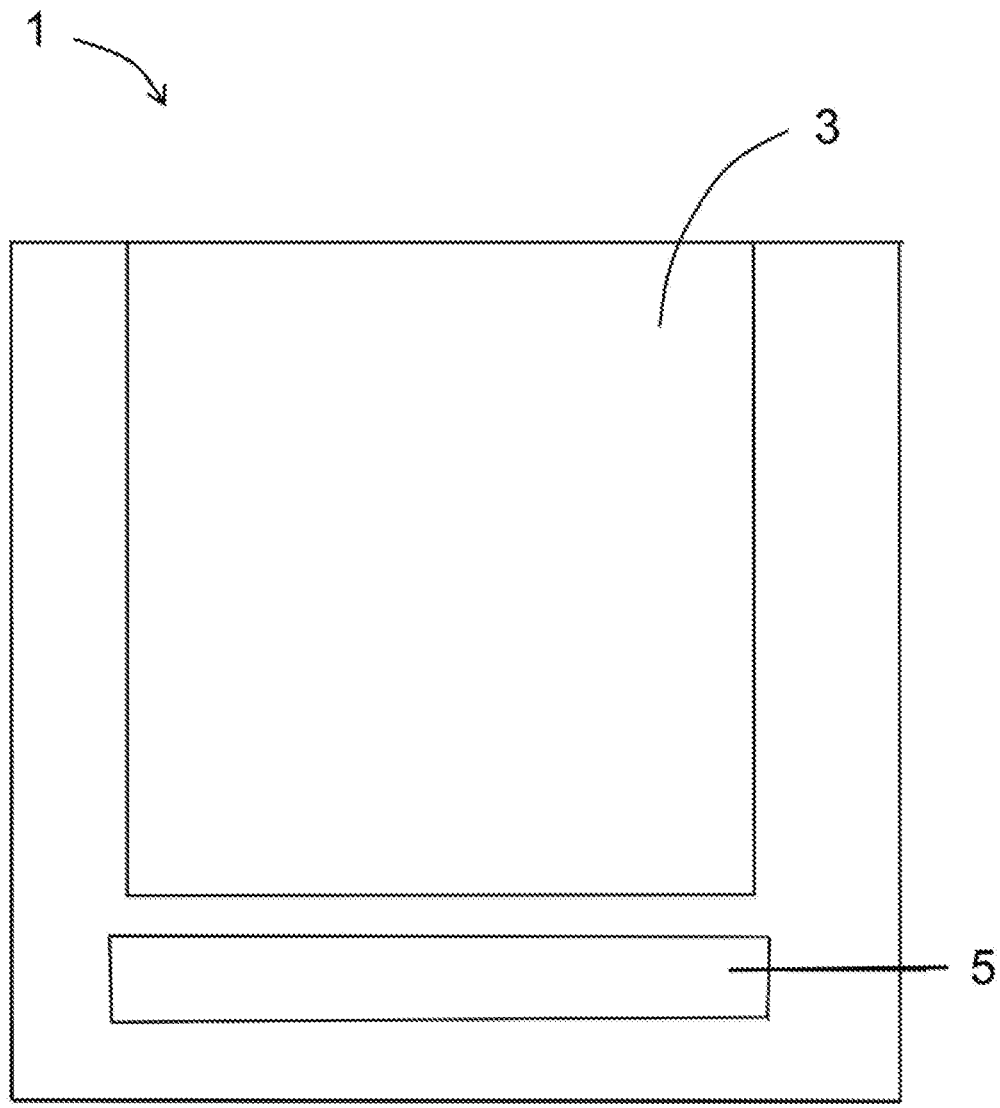
FIG. 4 is a bottom view of the landing pad in FIG. 1.

FIG. 4 is a bottom view of land pad 1. It shows electronic housing 5 and storage compartment 3.

Figure 5A:
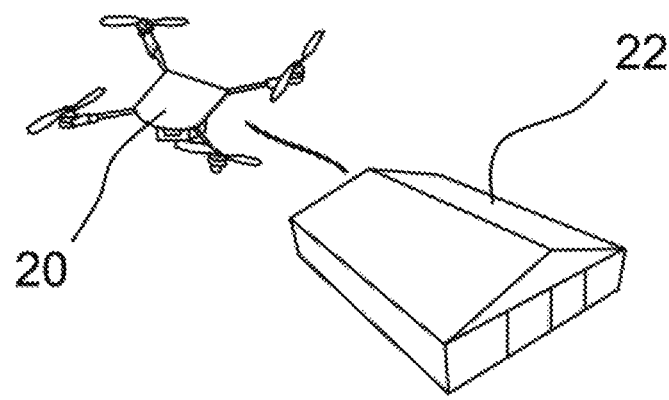
FIGS. 5A, 5B and 5C depict the stages of drone delivery.
Figure 5B:
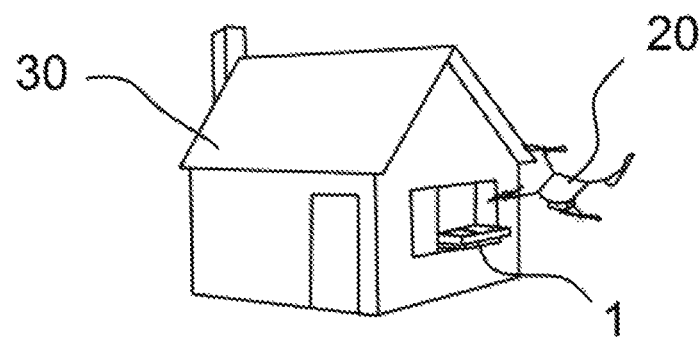
Figure 5C:
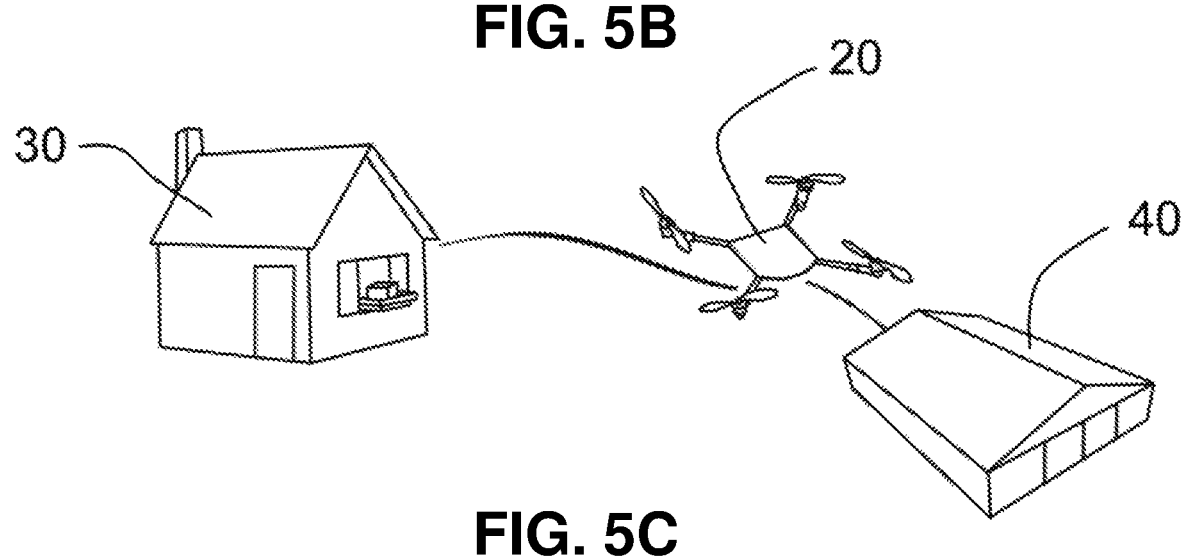

FIGS. 5A, 5B and 5C depict the steps of the drone delivery method. FIG. 5A depicts drone 20 with proper data relayed or stored, departing distribution facility 22 with package 25 (see FIG. 6A).

FIG. 5B shows that upon travel to recipient's location 30, drone 20 can conduct the proper identification of landing pad 1 and, following a successful exchange of credentials, approach the landing pad 1 (see FIGS. 6A, 6B, 7A, 7B and 7C) and deliver the package.

FIG. 5C shows drone 20 traveling back to subsequent destination 40, whether that is an original distribution facility 22 or another location.

Figure 6A:
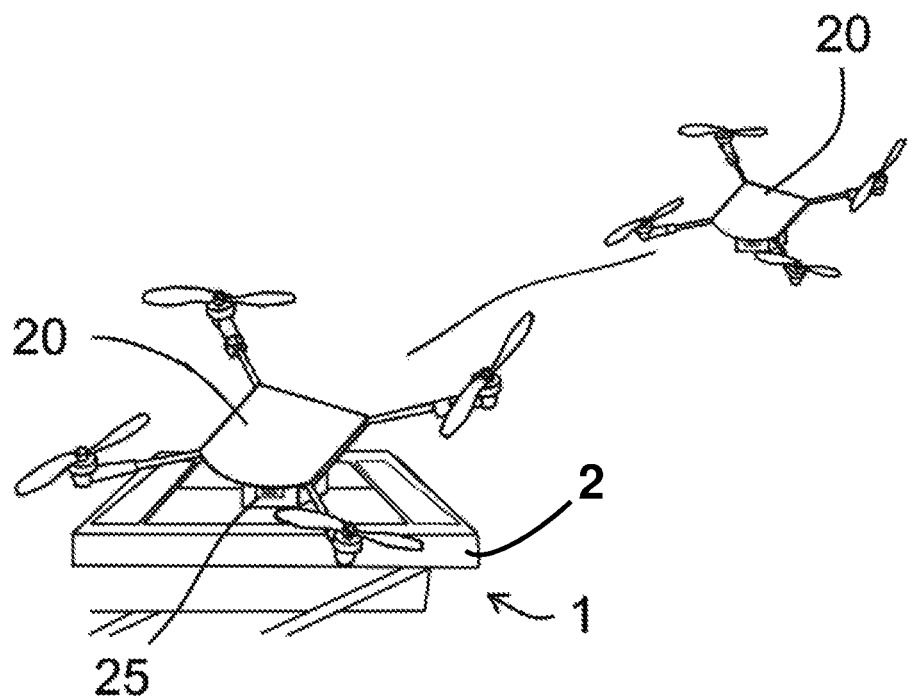
FIGS. 6A and 6B depict the actual delivery of the package to the landing pad.
Figure 6B:
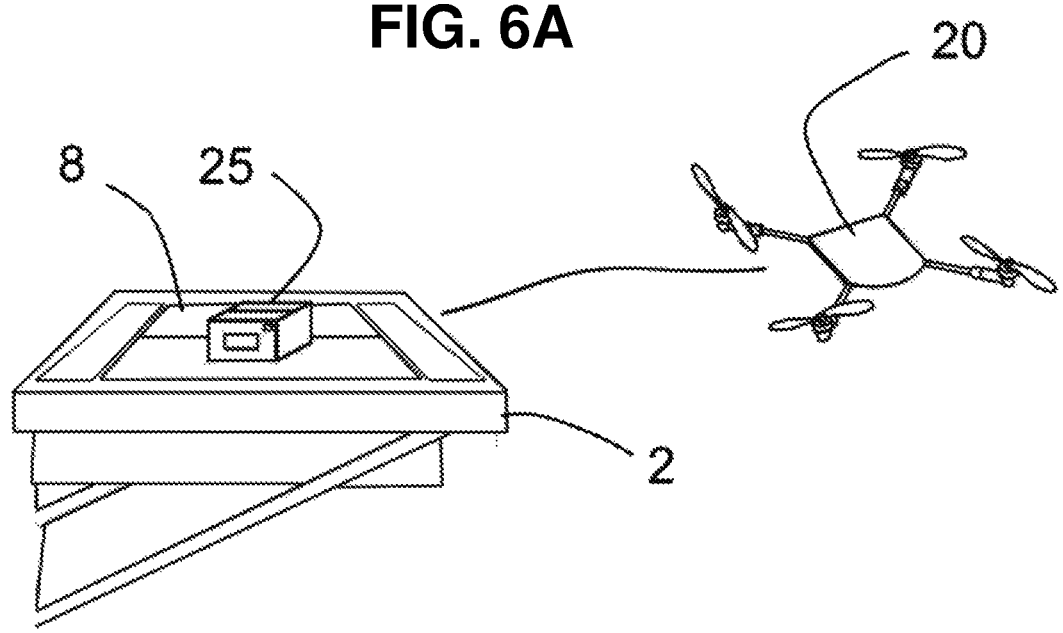

FIGS. 6A and 6B depict the function of landing pad 1 upon successful credential transfer between drone 20 and landing pad 1 and the subsequent approach of drone 20 to landing pad 1.

FIG. 6Aa shows drone 20 landing upon landing platform 2. Drone 20 then releases package 25 as shown in FIG. 6B and continues to subsequent destination 40 (not shown). The package remains on landing platform 2 until trapdoor 8 opens.

Figure 7A:
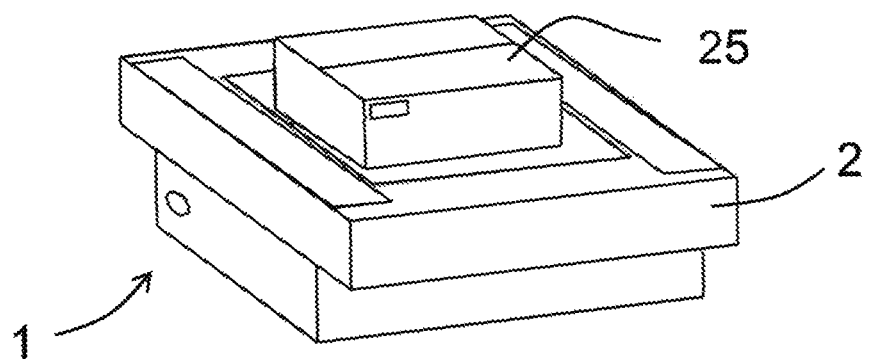
FIGS. 7A, 7B and 7C depict the use of the landing pad.
Figure 7B:
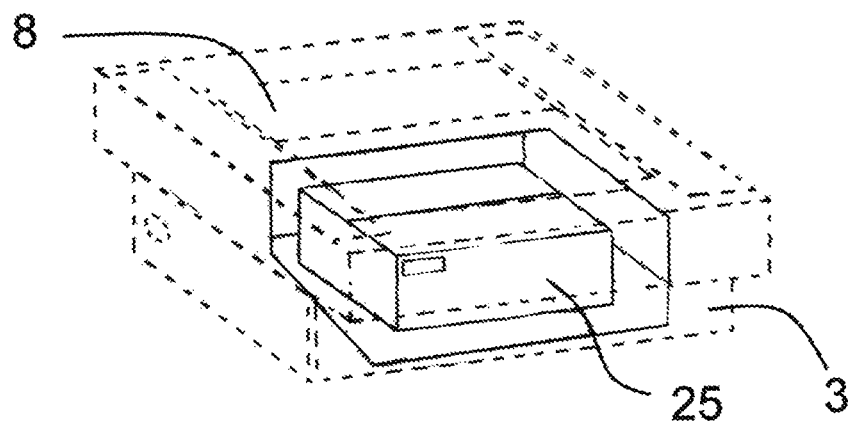
Figure 7C:
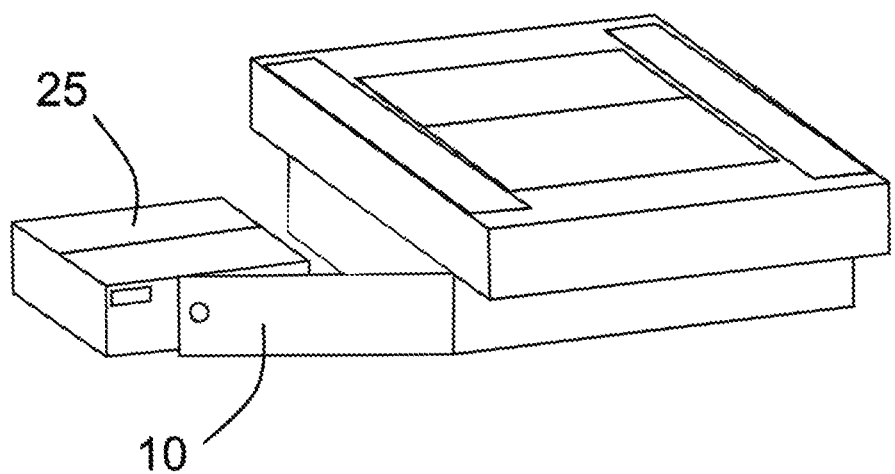

FIGS. 7A, 7B and 7C depict the steps of package 25 being left on landing platform 2 after successful delivery from drone 20 (see FIG. 7A), package 25 entering storage compartment 3 via trapdoor 8 (see FIG. 7B), and package 25 being removed by a user via storage door 10 (see FIG. 7C).

Whether notified by drone 20 or whether it senses the package via internal sensors, landing pad 1, aware that package 25 is upon landing platform 2, opens trapdoors 8 causing package 25 to drop into storage compartment 3. In some embodiments, before package 25 is delivered, a signature is obtained from the addressee and/or landing pad owner. This signature can be obtained physically and/or electronically such as via an email authorization. This added level of security allows for a single landing pad to be used by several unrelated individuals without the fear of others receiving valuable/and or personal deliveries.

In some embodiments, landing pad is configured to be used with an application that can run on, among other things, a smartphone, tablet, laptop, and/or personal computer. In some embodiments, the application confirms package deliveries and/or pickups. The application can also allow an individual to sign for deliveries and/or pickups. In some embodiments, the application also allows the user to modify various setting on the landing pad such as its internal climate.

In some embodiments, a notification is sent to a recipient of the successful delivery by means of text message, email, or notification on a smartphone application in conjunction with an LED or digital display on landing pad 1.

FIG. 7C depicts the recipient unlocking and opening storage door 10 and removing package 25 from the storage compartment 3.

Figure 8:
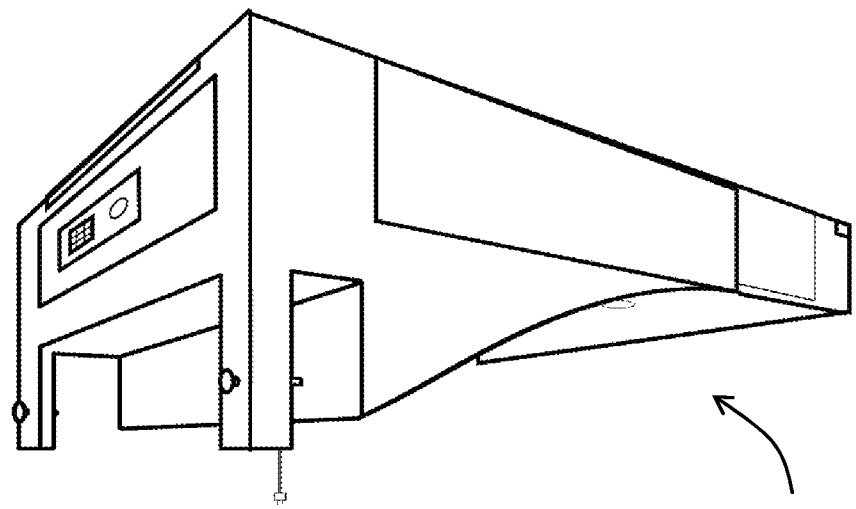
FIG. 8 is a perspective view of the front of a landing pad according to some embodiments.

FIG. 8 shows landing pad 1 configured to be placed in a window.

Figure 9:
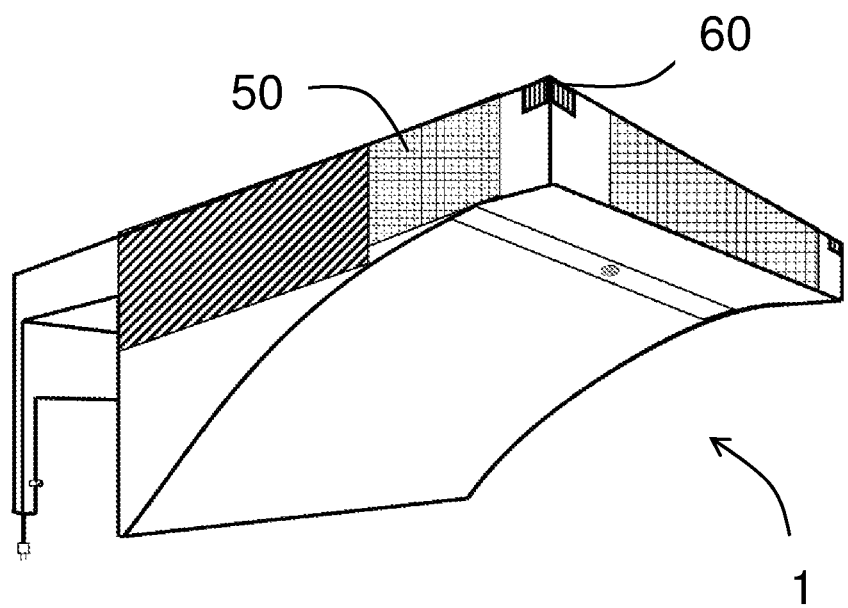
FIG. 9 is a perspective view of the back of a landing pad according to some embodiments.
Figure 10:
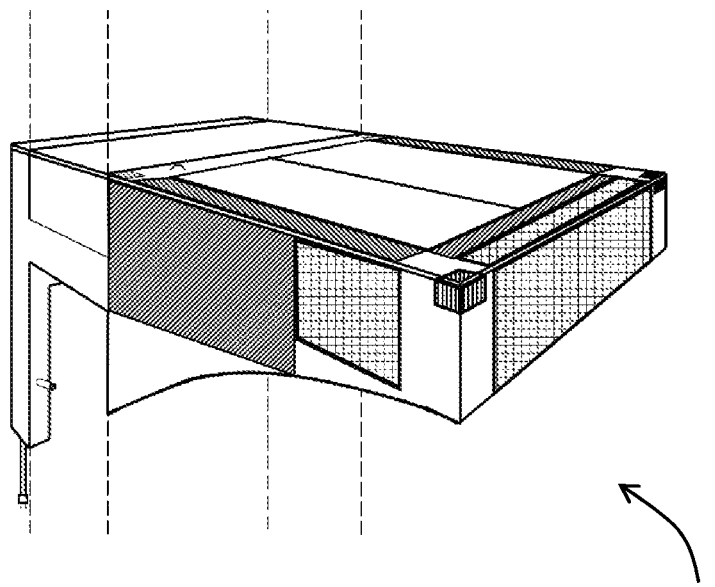
FIG. 10 is a perspective view of landing pad in a window.
Figure 11:
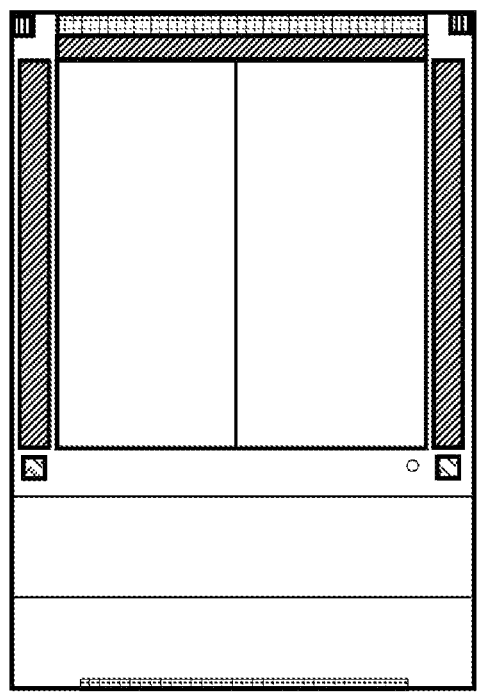
FIG. 11 is a top view of a landing pad according to some embodiments.

FIG. 9 illustrates, among other things, landing pad 1 with sound emitter 50 and transmitter 60.

Figure 12:
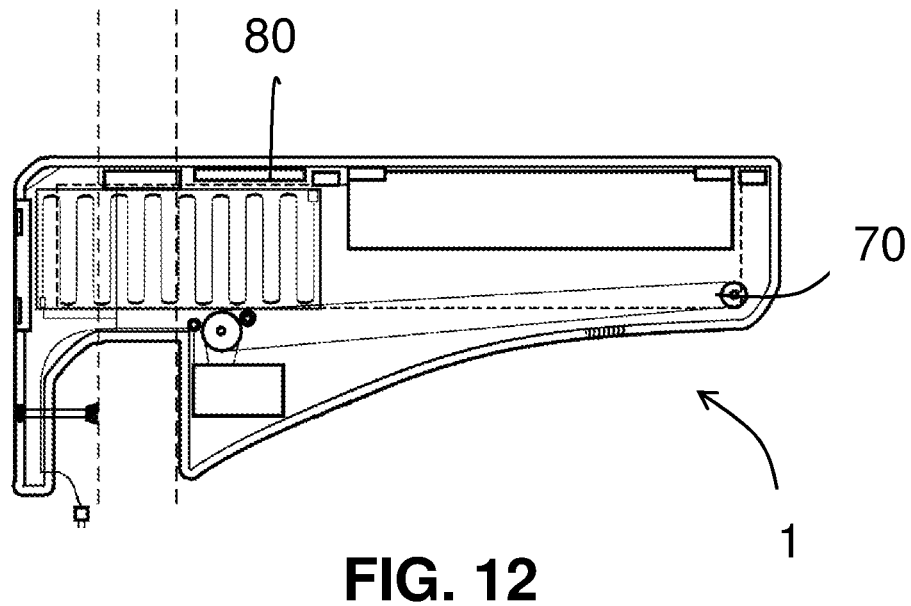
FIG. 12 is a side cutaway view of a landing pad with a conveyer belt.
Figure 13:
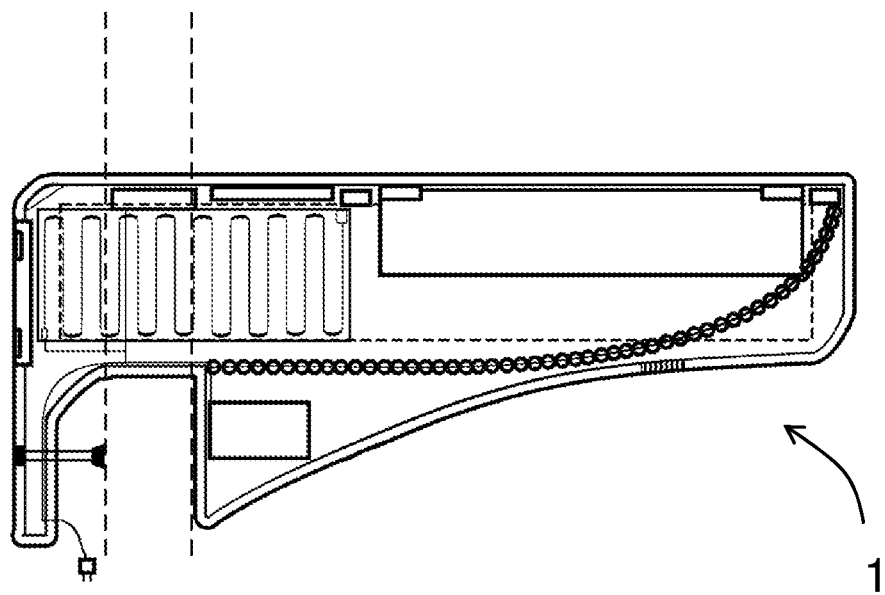
FIG. 13 is a side cutaway view of another embodiment of a landing pad.
Figure 14A:
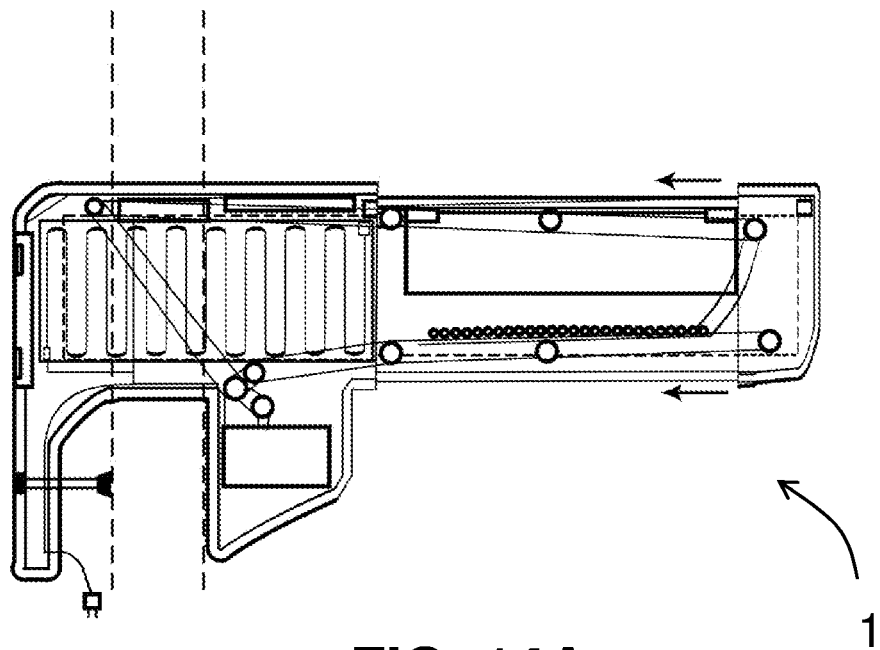
FIG. 14A is a side cutaway view of an expandable landing pad in an expanded state.
Figure 14B:
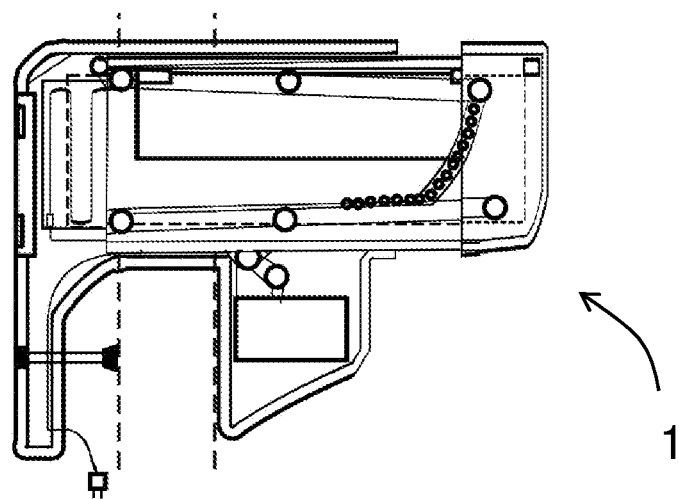
FIG. 14B is a side cutaway view of an expandable landing pad in a contracted state.
Figure 14C:
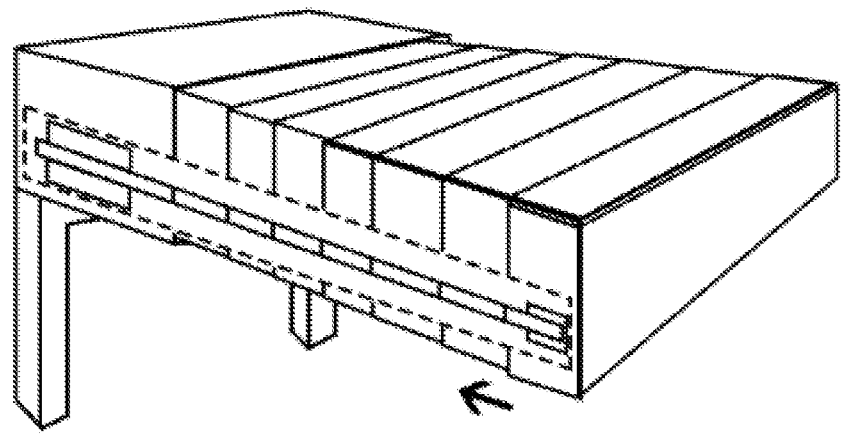
FIG. 14C is a side perspective view of an expandable landing pad in an expanded state.
Figure 14D:
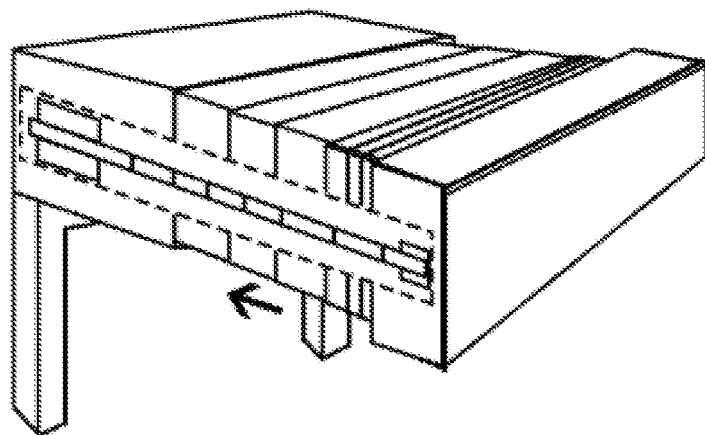
FIG. 14D is a side perspective view of an expandable landing pad in a semi-contracted state.
Figure 14E:
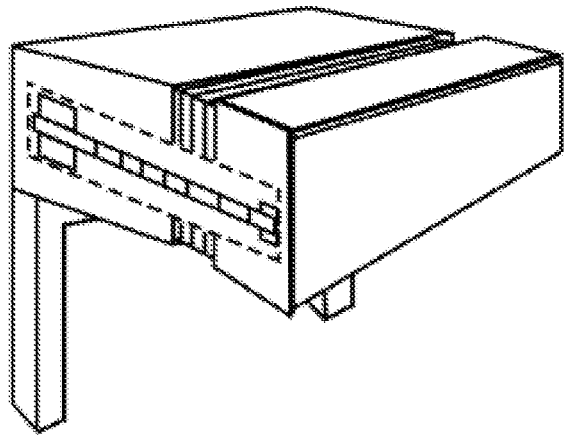
FIG. 14E is a side perspective view of an expandable landing pad in a contracted state.
Figure 15:
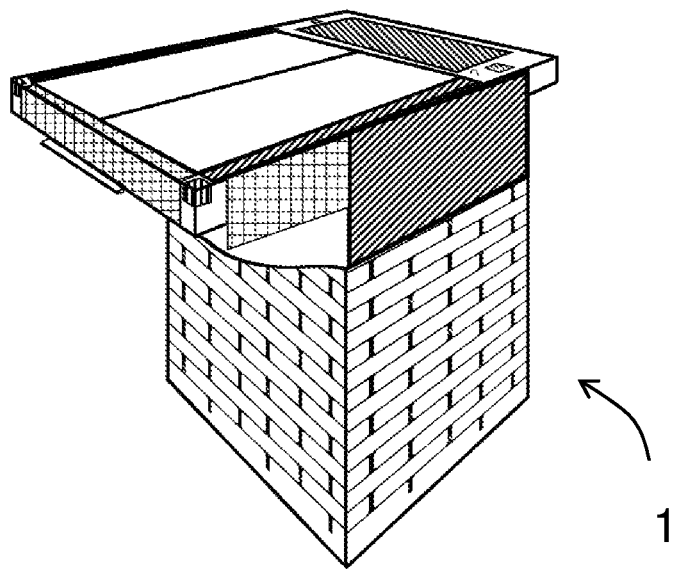
FIG. 15 is a front perspective view of a landing pad configured to be used on a rooftop.
Figure 16:
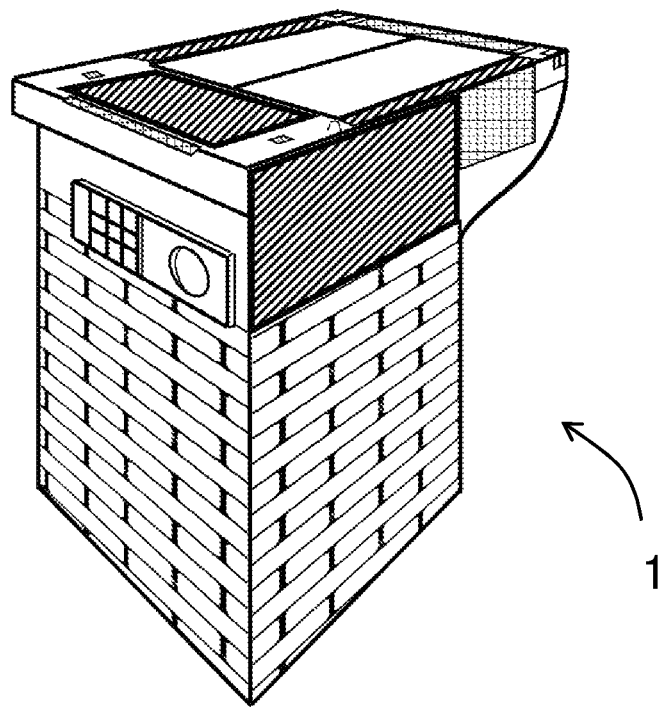
FIG. 16 is a back-perspective view of a landing pad configured to be used on a rooftop.
Figure 17:
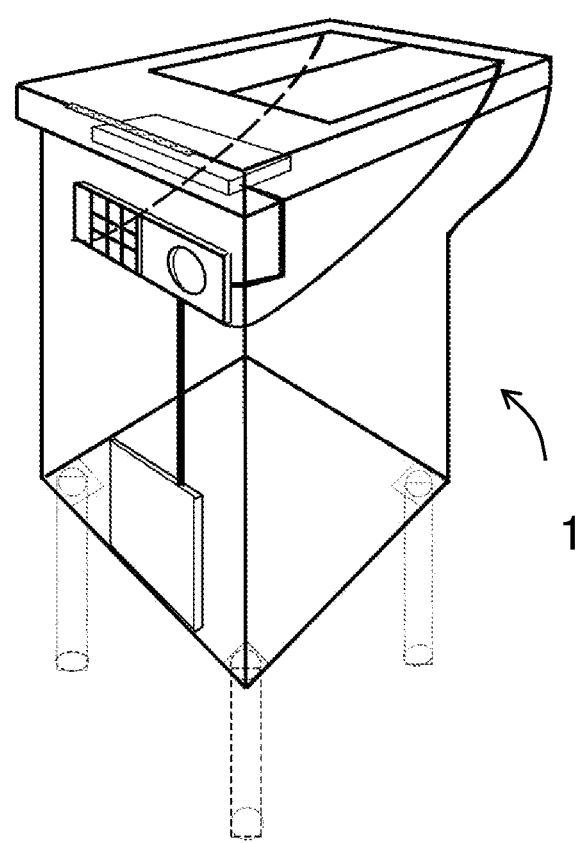
FIG. 17 is a back-perspective view of a landing pad configured to be used in a field.
Figure 18A:
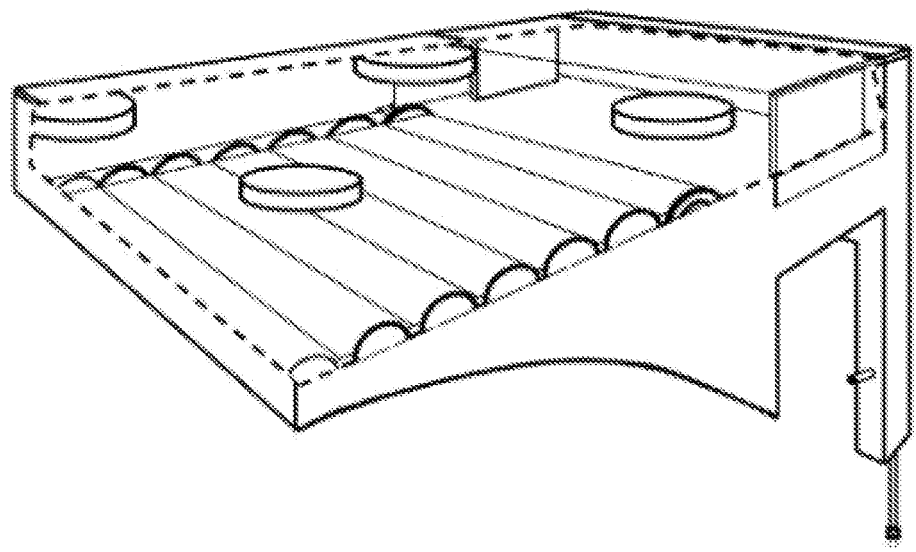
FIG. 18A is a perspective view of a landing pad that doubles as a wireless charging station.
Figure 18B:
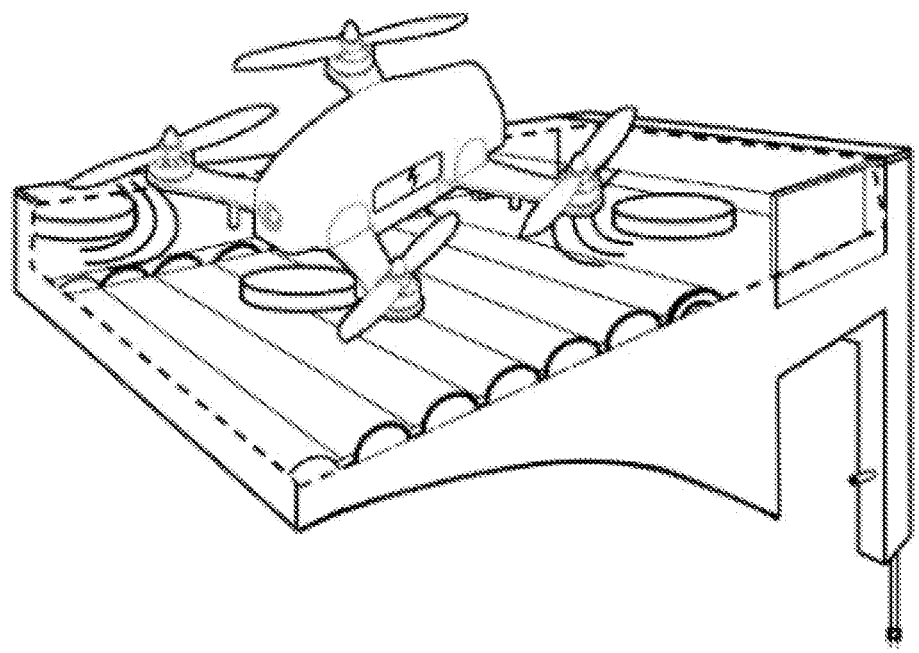
FIG. 18B is a perspective view of a landing pad that doubles as a wireless charging station charging a drone.
Figure 19A:
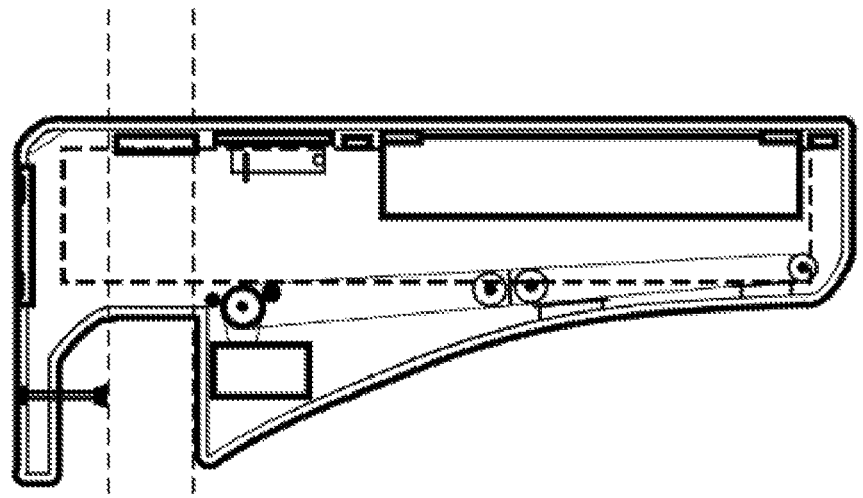
FIG. 19A is a side cutaway view of a landing pad with a hydraulic floor.
Figure 19B:
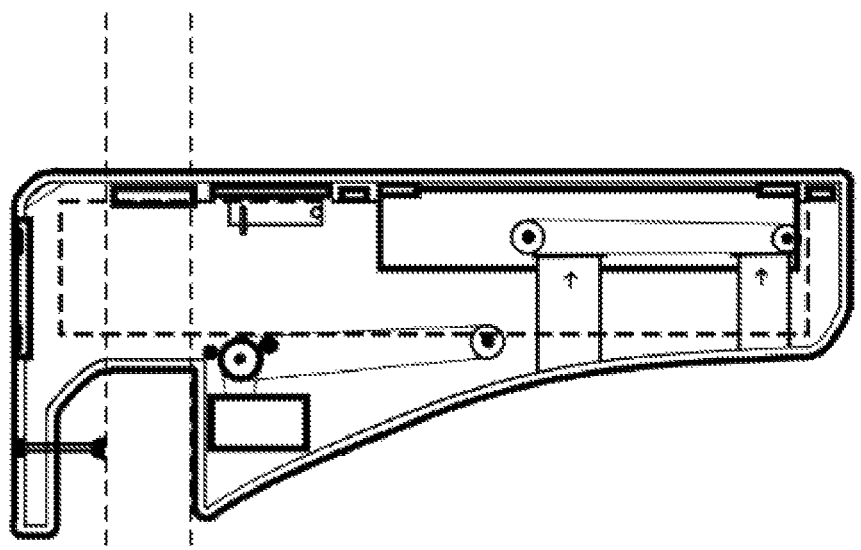
FIG. 19B is a side cutaway view of a landing pad with a hydraulic floor in which part of the floor is in a raised position.

FIG. 12 illustrates, among other things, landing pad 1 with conveyer belt 70 and climate control mechanism 80.

Landing Pad Configured to Utilize Scanners

Figure 20A:
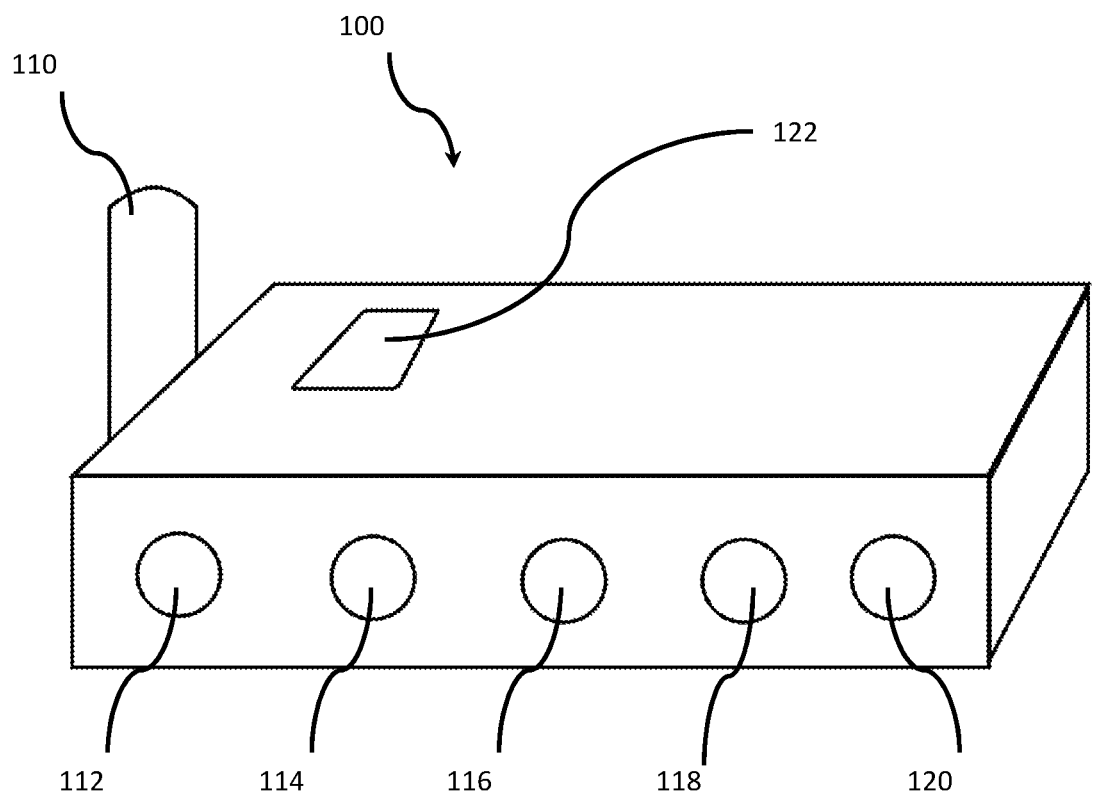
FIG. 20A is a side perspective view of a scanner configured to be utilized with a landing pad.

FIG. 20A is an illustrative embodiment of scanner 100. In some embodiments, scanner 100 has antenna 110 allowing it to communicate through to outside servers and/or with nearby drones. In some embodiments, scanner 100 in connected to the internet. In some embodiments, scanner 100 communicates with drones and/or other scanners via wireless standards such as, but not limited to, LTE, Wi-Fi and/or Bluetooth.

In the embodiment shown in FIG. 20A five separate sensors 112, 114, 116, 118, and 120 are contained within scanner 100. In some embodiments, scanner 100 can include display screen 122. Display screen 122 can be used to, among other things, monitor and calibrate scanner 100. In some embodiments, display screen 122 can have soft buttons.

Sensors contained within scanner 100 can comprise Geiger counters, Explosives Trace Detectors (ETDs), Chemical Agent Detectors (such as military grade chemical and industrial vapor detectors), Narcotics Detectors (such as handheld narcotics analysis detectors used by law enforcement), and MRI and X-ray type mail scanners (such as those employed by postal services for security). Other types of scanners can also be included in scanner 100, particularly scanners commonly used in mail processing and transportation security.

Some threats that can be detected by scanner 100 include, but are not limited to, nuclear materials, biological agents, chemical agents, narcotics agents, and explosives. These threats can pose harm to the occupants of a building receiving a parcel.

In some embodiments, scanner 100 can alert the occupants of a building to a given threat. In some embodiments, scanner 100 alerts the occupants via audible and/or visual alarms. In other or the same embodiments, scanner 100 can alert the occupants via a text message, phone call, email, and/or other electronic communication.

In some embodiments, scanner 100 can also use a wired and/or wireless communication system to contact local law enforcement and/or a third-party monitoring service in the event of a delivery of a hazardous material.

In some embodiments, scanner 100 can cause the landing pad to lock its trapdoors in the event of certain detections. Some embodiments allow for a landing pad to be hermetically sealed when a biological, chemical and/or nuclear agent is detected. In some embodiments, a vent on the exterior facing side of the landing pad vent airborne threats away from the building.

In some embodiments, a low-pressure system can be created in the landing pad's chamber to inhibit air leakage to the exterior. In other embodiments, a high-pressure system can be created to force air through a prespecified duct. In some embodiments, the duct has a filter system.

Figure 20B:
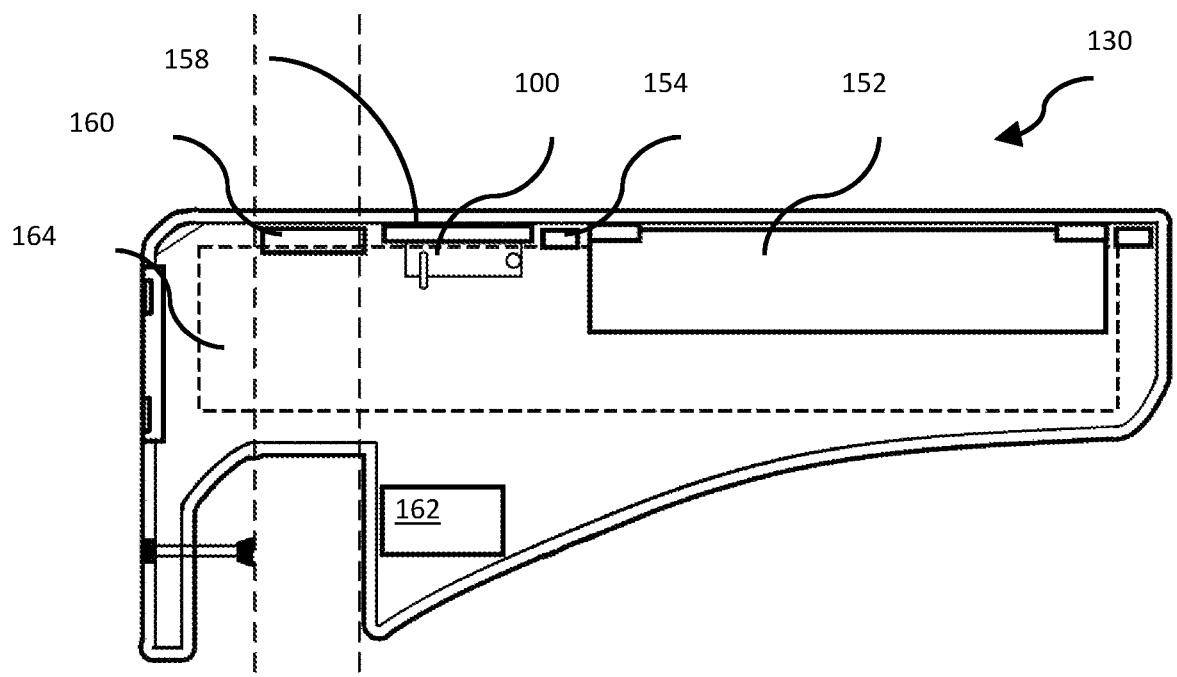
FIG. 20B is a side cutaway view of a landing pad utilizing the scanner of FIG. 20A.

FIG. 20B shows landing pad 130 having trapdoor 152 shown in the open position allowing parcels to enter chamber 164. In the embodiment shown, battery pack, 162, can act as a power source. Scanners and wireless transmission equipment are contained in housing 160, 158, 154, and 100. Scanners can be, but are not limited to Geiger counters, Explosives Trace Detectors (ETDs), Chemical Agent Detectors, Narcotics Detectors, and MRI and X-ray type mail scanners. Wireless transmission equipment can include, but is not limited to, routers and signal boosters. Additionally, electronics housings can contain operative components to operate trapdoor 152, storage equipment for camera feeds, and small screens and other storage/processing equipment to allow for electronic interfacing with landing pad 130.

In some embodiments having a hide-away system (such as those shown in FIG. 24A-27B), the rotating system can be configured to keep material deemed potentially hazardous by scanner 100 on the outside of the building.

In some embodiments, scanner 100 is linked to a single interface and a central processor. In some embodiments, scanner 100 and the processor share an electrical supply. In some embodiments, the electrical supply can come from a unit housed within the landing pad. In some embodiments, the electrical supply can be a battery. In some embodiments, the battery acts as secondary source of power. In some embodiments, the battery can be activated if the primary power is shut-off to scanner 100, either automatically or manually, depending on the chosen embodiment.

In some embodiments, scanner 100 is positioned within landing pad 130 such that the various sensors make physical contact with the parcels.

In embodiments having a multiple vault system (such as the embodiment illustrated in FIG. 22A), each vault can have its own scanner. In some embodiments, a single scanner can be used in a primary vault, before the parcel is sorted into its destination vault.

In some embodiments, scanner 100 can include at least one environmental sensor configured to measure various factors such as the exterior temperature, wind direction, wind speed, barometric pressure and/or other meteorological data that would be pertinent to a drone's operations and calculations. In some embodiments, scanner 100 can transmit this data to the drone to aid the drone in making real-time adjustments in dropping off and/or picking up parcels. Having landing pad 130 conduct these calculations via scanner 100 can alleviate the need for drones to have excess processing power.

In some embodiments, at least two landing pads can communicate with each other to map out current weather patterns for a given area. For example, in urban environments that have large wind, a network of platforms can be configured to create a real-time map of wind patterns on micro and/or macro scales. These real-time maps can be used by drones to make flight adjustments en route.

In some embodiments, a weather management system can utilize a linked network of landing pads with environmental sensors. In some embodiments, data generated for the weather management system is shared among the landing pads directly. In some embodiments, data generated is processed through a central location.

In some embodiments, mailboxes in a given section can alternate taking readings from their various sensors. In some embodiments, this smaller (more efficient) collection of readings is sufficient to generate weather maps and helps prevent, or at least reduce, the possibility of saturating the network. In at least some embodiments, switching among sensors, conserves power.

In at least some embodiments, the weather management system considers data generated from drones, landing pads, and/or third-party sources. These multiple layers of data can allow for better air current maps and forecasting.

In at least some embodiments, a thermal heat conducting mechanism is located on landing pads to prevent snow accumulation. In some embodiments, the thermal heat conducting mechanism is located on the top and/or other flat portions on the upper surface of the landing pad. In at least some embodiments, the heat conducting mechanism is designed to raise the surface temperature of the platform to promote evaporation. In at least some embodiments, the heat conducting mechanism raises the temperature of the landing pad above freezing.

In at least some embodiments, the heat conducting mechanism relies on data generated from a weather management system and/or other cloud based temperature readings to determine when to switch on. In other or the same embodiment, the heat conducting mechanism can be configured to turn on by the user, either via a physical switch or via a networked app and/or computer.

In some embodiments, the heat conducting mechanism receives data directly from environmental sensors within the landing pad. In some embodiments, the settings of the heat conducting mechanism, such as starting time, run time, temperature, and the like, can be adjusted to more efficiently melt any accumulated snow and/or prevent future snow accumulation. In at least some embodiments, a feedback loop is utilized to reduce the chance of the heat conducting mechanism overheating.

In at least some embodiments, the top of the landing pad is angled to promote the runoff of melting snow, rain, and/or debris such as leave. In at least some embodiments, this angle is slight enough to not interfere with creating a stable landing surface for a drone.

Landing Pads Configured to Use Cameras

Cameras can be incorporated in landing pads to, among other things, increase building security, aid in determining how wide to open the door (for those landing pads with adjustable doors), provide for remote troubleshooting/diagnostics, detect incoming drones, and provide a method for two-party visual verification.

Figure 21A:
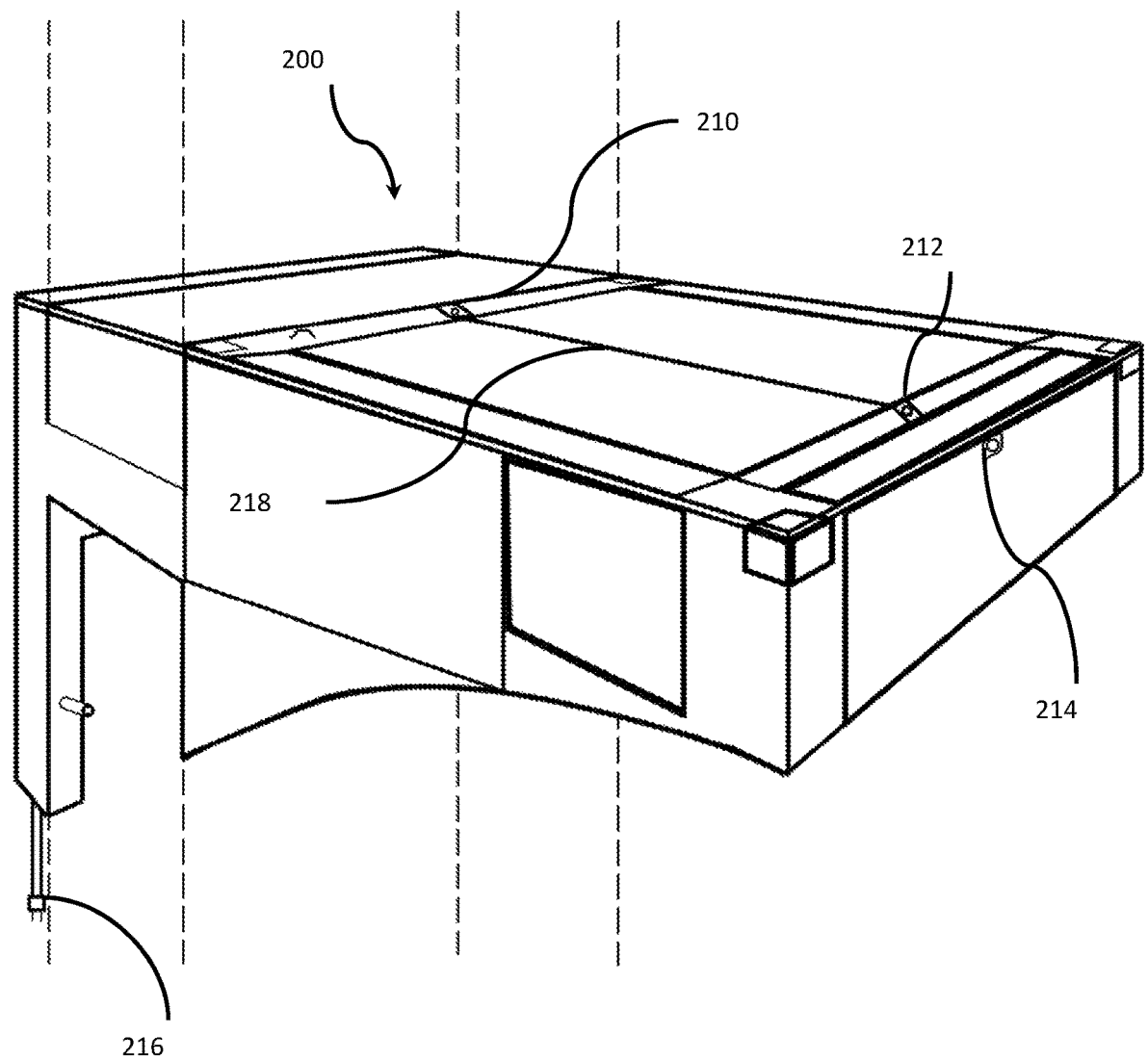
FIG. 21A is a side perspective view of a landing pad configured to utilize multiple cameras.

FIG. 21A shows one embodiment of camera placement on landing pad 200. In the illustrated embodiment, three cameras 210, 212, and 214 are shown. The number and placement of cameras can vary depending on the landing pad. For example, a hideaway landing pad can have cameras located at different places than a stationary landing pad.

In some embodiments, cameras 210 and 212 can have a hemispherical field of view, to see the sky and approaching unmanned aerial vehicles. In some embodiments, camera 214 also has a hemispherical field. However, to lower power consumption, in some embodiments camera 214 can have quarter sphere field of view. This is particularly useful when landing pad 200 is near ground level. If landing pad 200 is on the upper floors of a building, however, a hemispherical field of view might be more appropriate, as incoming unmanned aerial vehicles can approach from beneath landing pad 200.

In some embodiments, such as hideaway landing pads, a camera can be placed on the rear of the landing pad. (see camera 730 in FIG. 26B for one example of a location). In some embodiments, camera 730 can have a 180-degree horizontal field of view and a 90-degree vertical field of view allowing for the camera to see approaching unmanned aerial vehicles from the rear of the hideaway landing pad. The rotating system can then actuate to reveal a landing area, which can include a variety of camera positions such as those shown on FIG. 21A.

In some embodiments, such as on stationary landing pad 200, camera 214 with a quarter-sphere field of view can be mounted on a front face of landing pad 200. Camera 214 can be used to detect incoming unmanned aerial vehicles. In some embodiments, camera 214 can be used to detect incoming parcels, and actuate a trapdoor. This type of camera can also be present on hideaway landing pads.

In some embodiments, a third camera is present such as camera 212. In some embodiments, camera 212 can have a fisheye lens. Camera 212 can be mounted in various positions of FIG. 21A. In some embodiments, camera 212 is positioned on a top portion of a back wall of a hideaway landing pad. In some embodiments, camera 212 can be used for security purposes such as monitoring the landing pad and surrounding area for potential intruders.

In some embodiments, the cameras are connected to a central processing system, a network communication system and/or a storage system to store video files. In some embodiments, stored video files can be accessed by computers, tablets, smartphones, and the like. In some embodiments, video can be accessed online via a secure server. In some embodiments, at least some of the cameras can stream video allowing the area around the landing pad to be monitored in real time. In certain embodiments, the camera(s) automatically uploads video to a private server, the cloud, and/or other offsite storage. In some embodiments, this uploading is performed automatically.

In at least some embodiments, the camera(s) located on the landing pad are often in a passive state, that is they are not actively being used to help coordinate delivery/pickup of a package. In at least some of these embodiments, cameras in a passive state can be used by individuals, a network and/or Artificial Intelligence to scan the skies. This data can be used to monitor for potential issues. In some embodiments, the cameras could be turned on at particular times, such as in natural disaster and/or terrorist attack, to monitor the area. In some embodiments, the cameras can be linked with air regulatory commission or other authorities such as the local police.

In some embodiments, the cameras have algorithms and/or AI software that detects threats and automatically assesses the potential for danger. In some embodiments, landing pad 200 alerts the owner of landing pad 200 through notifications, texts, emails, and the like if the proper criteria and/or threshold is met.

In some embodiments, cameras can be used to provide for troubleshooting, diagnostics, and general maintenance of the landing pad and/or drone. For example, cameras can be used to, among other things, determine if animals are nesting on or near landing pad 200, parcels are not seated or delivered properly, and/or if there are other mechanical issues present. In some embodiments, the video stream(s) from the camera(s) can be viewed remotely by the owner or account holder of landing pad 200, a building supervisor, and/or a third party technical support team.

In some embodiments, camera(s) can be used in conjunction with other sensors to generate a full diagnostic report. In some embodiments, AI and/or algorithms can be used to determine the cause of the malfunction and/or issue diagnostic reports.

In some embodiments, a camera can be present in the compartment of the landing pad and can be used to detect the parcel and/or scan the parcel for information through QR code, UPC code, or other visual verification. This information can include, but is not limited to, the sender, the drone delivery operator, the intended recipient, the intended address, the contents of the parcel, any handling or care instructions such as whether it needs to be heated or cooled, if it must be certified or signed for by the recipient, and/or the like. In some embodiments, this information can be compiled and automatically uploaded to a private server, the cloud, and/or other offsite digital storage method.

In some embodiments, at least one camera can be used for Two-Party Visual Verification. Two-Party Visual Verification can incorporate a variety of methods, and is particularly helpful if the wireless verification between the drone and landing pad is unsuccessful. In some embodiments, the landing platform can use an LED screen or light arrays to display a specific visual code or sequence that can be verified algorithmically by the drone and/or remotely by a drone operator. The drone can then use a combination or individual systems of lights, flight patterns, specific motions, or other acknowledgments that can be verified by the landing pad.

This can be done autonomously between the drone and the landing pad, remotely and manually between the landing pad operator and the drone operator, or combination of autonomous and manual operations.

Figure 28A:
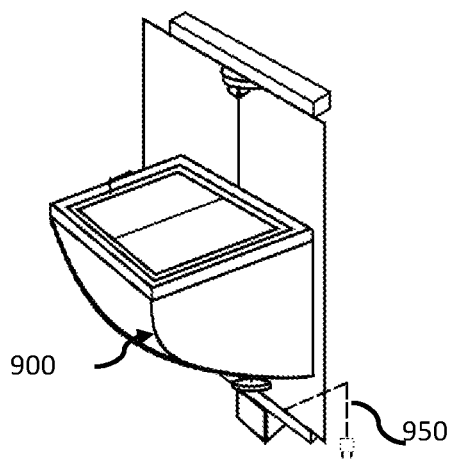
FIG. 28A is a side perspective view of a hideaway landing pad with a power cord.
Figure 28B:
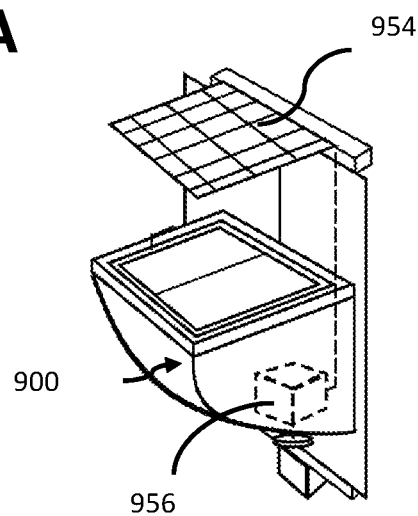
FIG. 28B is a side perspective view of a hideaway landing pad with a solar power source and rechargeable battery.

In some embodiments, at least one camera can be affixed to trapdoor 218. Power for electrical systems, such as the actuating system for the trapdoor, power for the cameras, power for video storage, power for scanners, power for a rotating hideaway system, and/or other electronics, can be obtained via cable 216. FIGS. 28A-28B show embodiments utilizing various power sources.

Figure 21B:
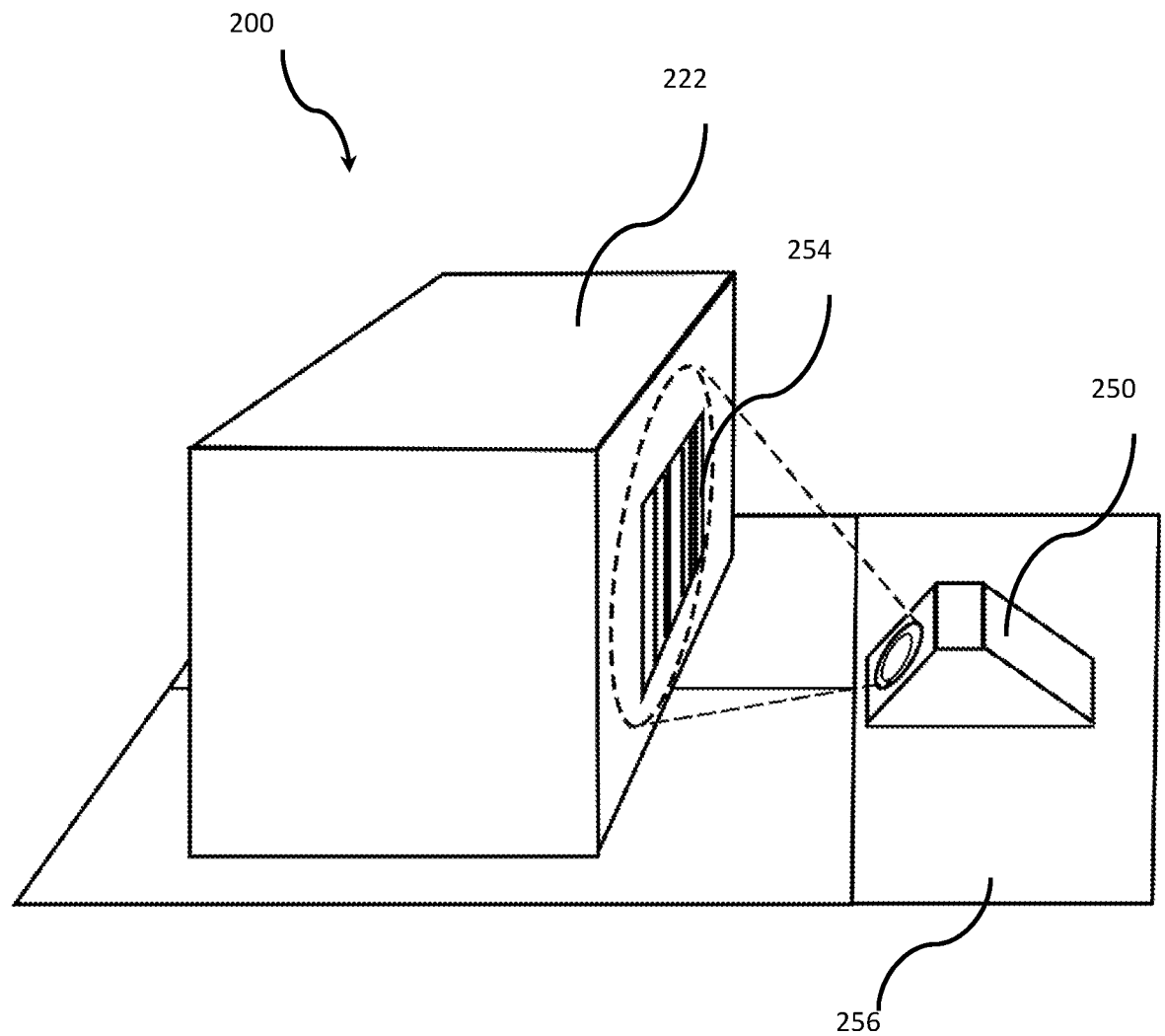
FIG. 21B is a top perspective view of landing pad with a camera scanning a parcel.

In FIG. 21B, landing pad 200 is shown, wherein camera 250 is mounted on landing pad surface 256. Parcel 222 with visual code 254 is placed on landing pad surface 256. Code 254 can be a bar code, QR code and/or other visual identification that can be visually detected by camera 250.

When parcel 222 arrives, a drone can orient visual code 254 such that it can be detected by camera 250. The image of visual code 254 can then be used to identify parcel 222. In embodiments having multiple vaults, such as those shown in FIGS. 22A-22E, this information can be used to sort parcel 222 into the appropriate vault. In other or the same embodiments, identifying information can be used to notify a recipient that parcel 222 has arrived. In some embodiments, information present on code 254 can instruct a landing pad to adjust the conditions of a given vault, for example raising or lowering the temperature of the vault. In some embodiments, camera 250 is located inside the compartment of the landing pad and is activated when the trap door is opened.

User Interface Device

In some embodiments, a screen that allows a user to interact with a User Interface can be mounted on the interior surface of the building for window and building mounted mailboxes. In some embodiments, the screen is located directly on the mailbox. In other embodiments, the screen is located near the mailbox, such as being mounted on a nearby wall. In some embodiments the User Interface can be accessed via a computer, tablet, smartphone, and/or the like.

In some embodiments the User Interface can display and/or audibly convey information like storage instructions when an item is received. It can also display the dietary information of a meal that has been ordered and/or cooking instructions. In some embodiments it can display medicine or prescription information and instructions.

In some embodiments, the User Interface can tie into a greater smart home. In some embodiments the User Interface can display advertisements and/or recommendations based on data generated from previous orders and/or information acquired from third parties.

In some embodiments, the User Interface can link to a virtual assistant, customer service representative, pharmacist, personal cook, and the like.

In certain embodiments, the User Interface can be used to schedule deliveries. In some embodiments the User Interface works with other shopping/delivery applications such that various deliveries can be aggregated and combined in one platform.

In some embodiments the User Interface can give verbal and/or visual indication when a delivery is incoming and/or has been delivered. In some embodiments the User Interface can notify the user if the temperature of the interior or contents are in danger of leaving a given range. In certain embodiments, such as when the contents of a delivery are time and/or temperature sensitive, the User Interface can make visual and/or audio cues indicating there needs to be action taken. In some embodiments, the User Interface sends notices to a user via conventional means of communication including, but not limited to, email, phone calls, and/or text messages.

In some embodiments, the User Interface utilizes meteorological data such as but not limited to current outside temperatures, humidity, and precipitation forecasts.

In some embodiments, the User Interface is specific for a particular user. In some embodiments a user is defined by a unique phone number. In some embodiments, the User Interface can be limited in function for particular individuals, for example parents or employers can create restricted accounts for their children or employees.

In some embodiments, the User Interface allows individuals to link bank and/or credit accounts to their user account to debit and/or credit their accounts for different services and features associated with their mailbox. In some embodiments, subscription fees, delivery fees, service fees for pick up/returning items, can be debited from a user. In some embodiments, a user can be credited for allowing his landing pad to function as a charging station.

In some embodiments, the User Interface allows users to pay for goods and services directly through their mailbox through a point of sales system, whether through the interior visual display, a device connected through the interior visual, and/or another device through the app interface. In some embodiments, retailers and other service providers can provide users with invoices, receipts, and/or proofs of purchase through the User Interface. In some embodiments, the point of sales system is tied to the distributor's supply system and internal inventory monitoring and control systems as well as their bookkeeping software to allow for maintenance of financial record keeping.

In some embodiments, Data Models can be created based on, among other things, user preferences, purchases, and landing pad locations. For example, a user's purchase history can be used to predict the user's likely desires and offer most requested items ahead of schedule. In some embodiments, these likely desires can be selected to be ready for delivery during the expected time period that the user will request it. In certain embodiments, location based purchase history can be used to help predict and alleviate shortages.

In some embodiments, the Data Models are linked to a neural network including artificial intelligences, machine learning and/or further network enhancements.

Landing Pads Configured to Use Multiple Vaults

Figure 22A:
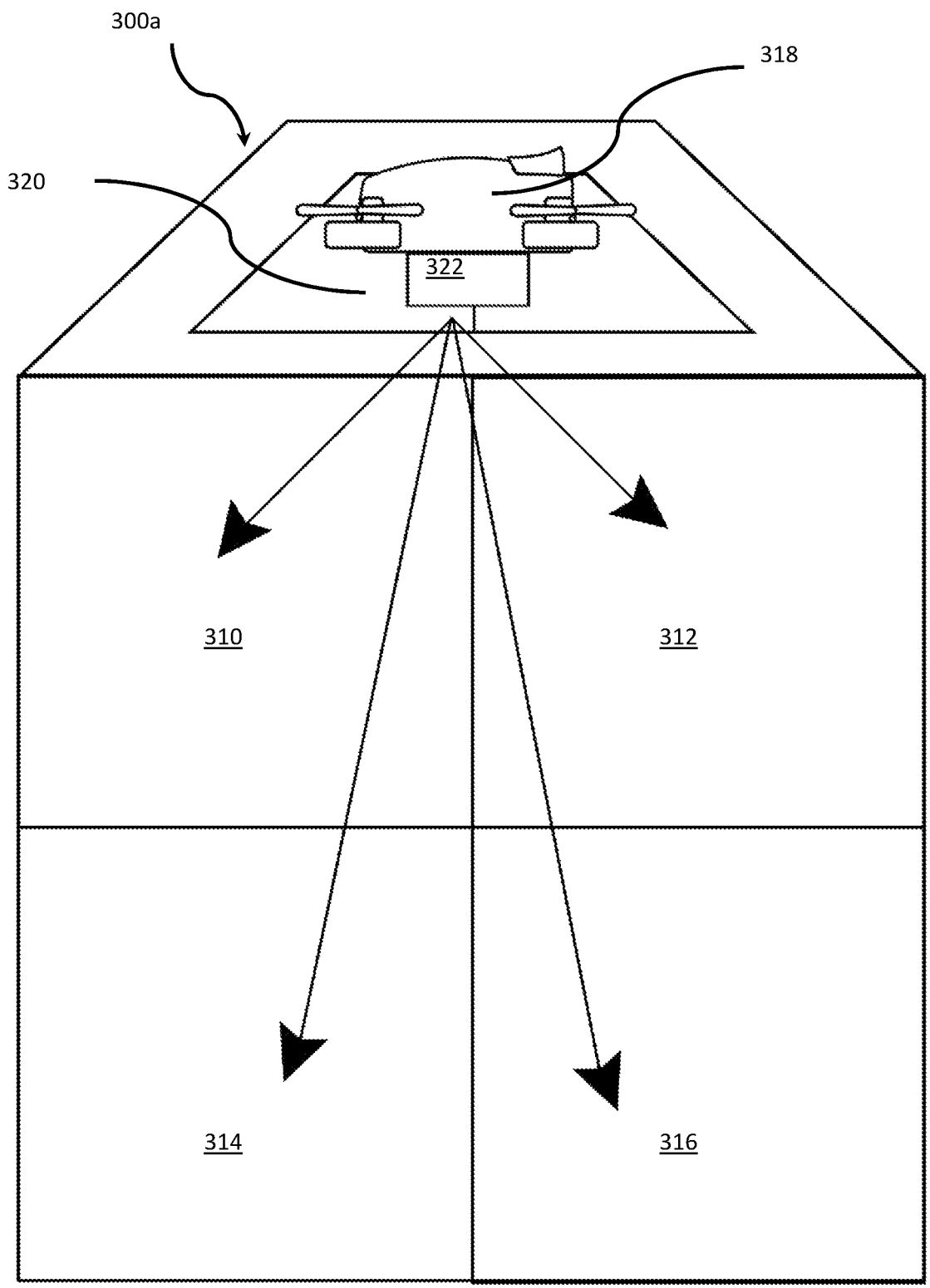
FIG. 22A is a front perspective view of an embodiment of a multi-vault landing pad.

FIG. 22A shows multi-vault landing pad 300a. In the illustrated embodiment, four separate vaults are shown, vaults 310, 312, 314, and 316. When parcel 322 falls through trapdoor 320, it is directed to one of four separate vaults 310, 312, 314, and 316, based on identifying information. Identifying information can include, but is not limited to, a radiofrequency identification (RFID) tag embedded within parcel 322, digital metadata, UPC codes, QR codes, or other visual verification codes that can be read using a camera/scanner system. The identifying information can tell a sorting system (not shown) which vault to distribute parcel 322. In some embodiments, parcel 322 can be identified based on the unmanned aerial vehicle 318 that delivers it. This identification of unmanned aerial vehicle 318 can be accomplished by the cameras during detection of unmanned aerial vehicle 318. This can be aided by prior knowledge of scheduled delivery times, and can be informed by updates of unmanned aerial vehicle locations. In some embodiments, unmanned aerial vehicle 318 can transmit identifying information to multi-vault landing pad 300 when it drops of parcel 322.

In some embodiments, this system can be gravity driven, such that only one vault is opened, and parcel 322 falls into that vault. In other or the same embodiments, various mechanical devices, such as robotic arms and pistons can direct parcel 322 into the correct vault.

Figure 22B:
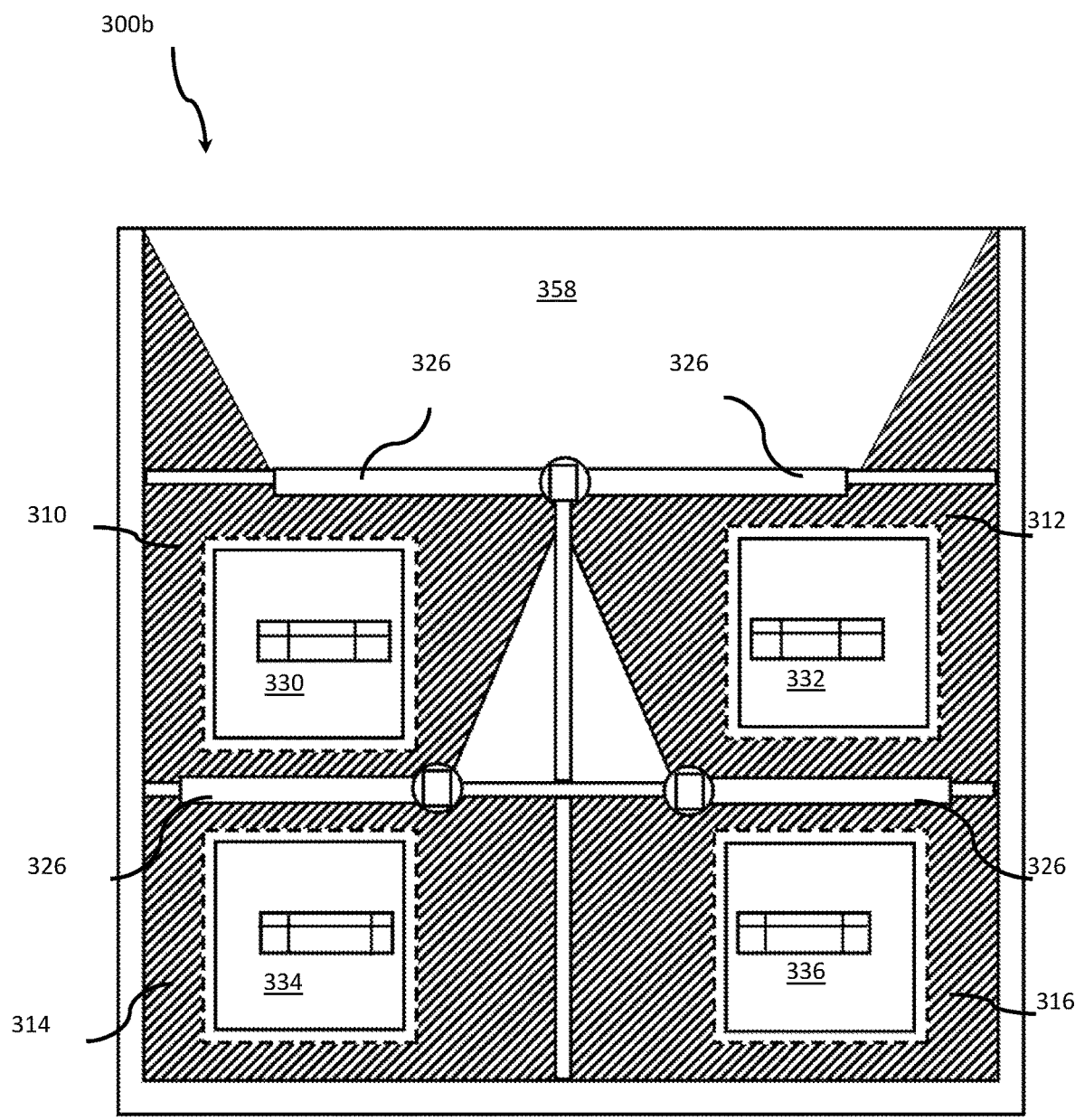
FIG. 22B is a front cutaway view of a multi-vault landing pad according to some embodiments.

FIG. 22B is a front partial-cutaway view of multi-vault landing pad 300b having four vaults: 310, 312, 314, and 316. Multi-vault landing pad 300b also has receiving vault 358 to initially receive parcels before they are sorted. In at least some embodiments, if a parcel is not sorted, it can be held in receiving vault 358 indefinitely. In at least some embodiments, trap doors 326 are opened according to the identifying information.

In some embodiments, doors 330, 332, 334, and 336 allow a recipient to access parcels in vaults 310, 312, 314, and 316. In some embodiments, doors 330, 332, 334, and 336 have locks.

Figure 22C:
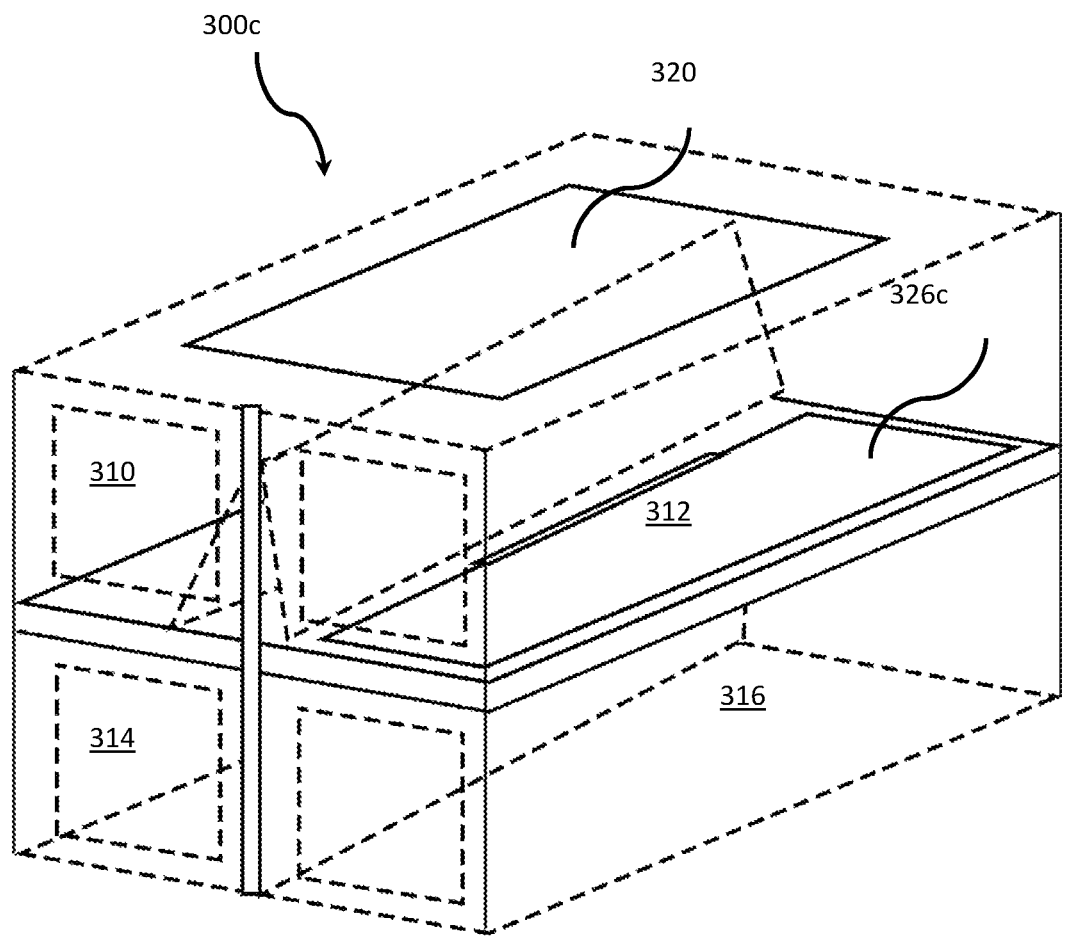
FIG. 22C is a side-cutaway perspective view of a multi-vault landing pad according to some embodiments.

FIG. 22C is a cutaway side-perspective view of multi-vault landing pad 300c. In the shown embodiment, four vaults 310, 312, 314, and 316 are gravity fed parcels. In some embodiments, such as the one shown, trapdoor 320 opens to direct a parcel into one of vaults 310 and 312. In the embodiment shown in FIG. 22C, trapdoor 326c in vault 312 can allow a parcel to fall into vault 316. A similar mechanism connects vault 310 to vault 314.

Figure 22D:
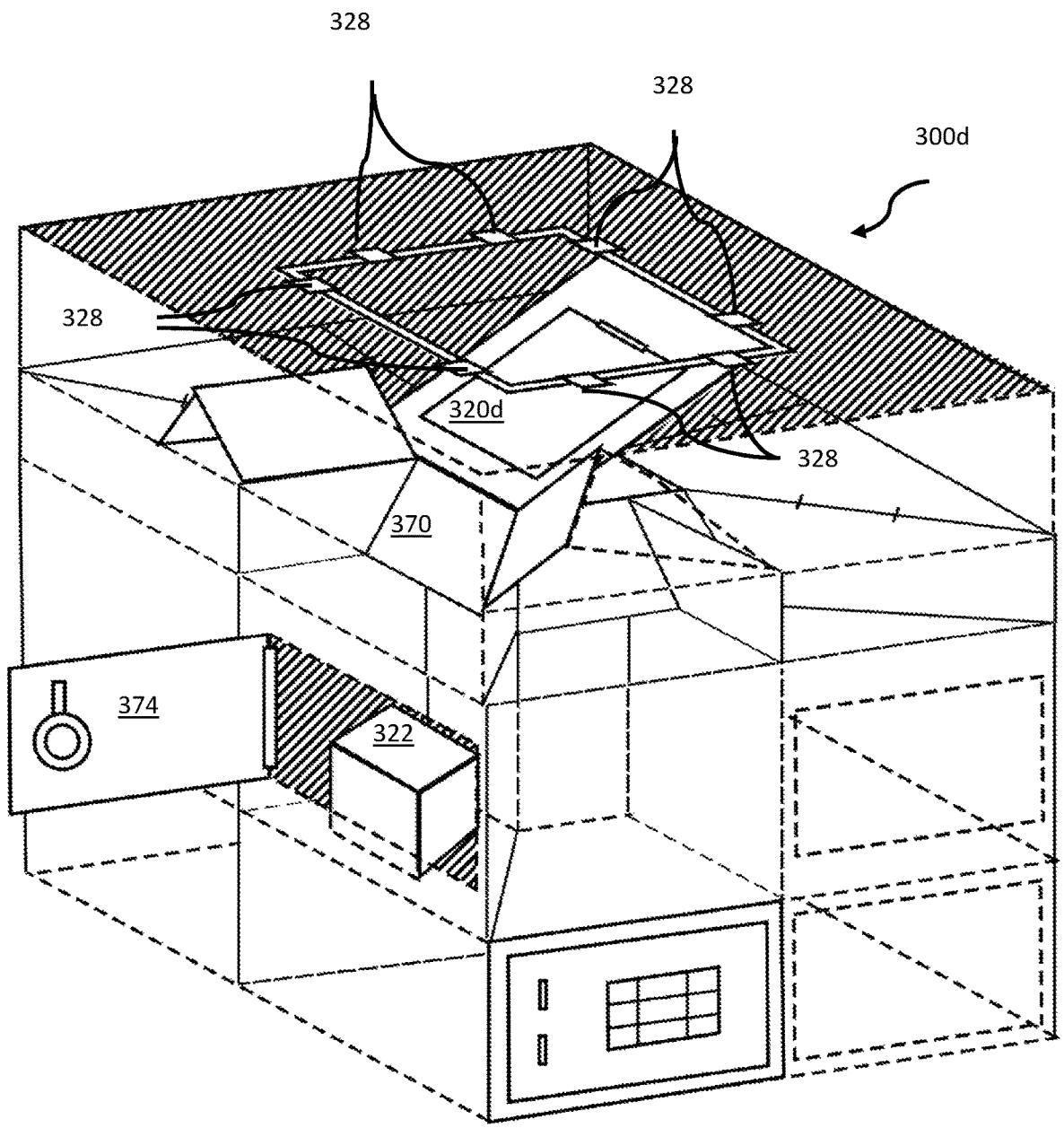
FIG. 22D is a side-cutaway perspective view of a multi-vault landing pad according to some embodiments.

FIG. 22D shows multi-vault landing pad 300d, which has trap door 320d held by hinges 328. In some embodiments, different pairs of hinges 328 can hold onto trap door 320 while the remaining hinges act as release points, allowing trap door 320 to fall with a particular configuration. For instance, as depicted in FIG. 22D, trap door 320d is shown in an orientation such that parcel 322 can slide down surface 370 into a vault behind door 374, which can be accessed by a user.

Multiple other vaults and surfaces for directing parcels are shown in FIG. 22D. Vaults can be various shapes and sizes, and have differing security measures for their entry, depending on the ownership of the vault and expected material to be received.

Figure 22E:
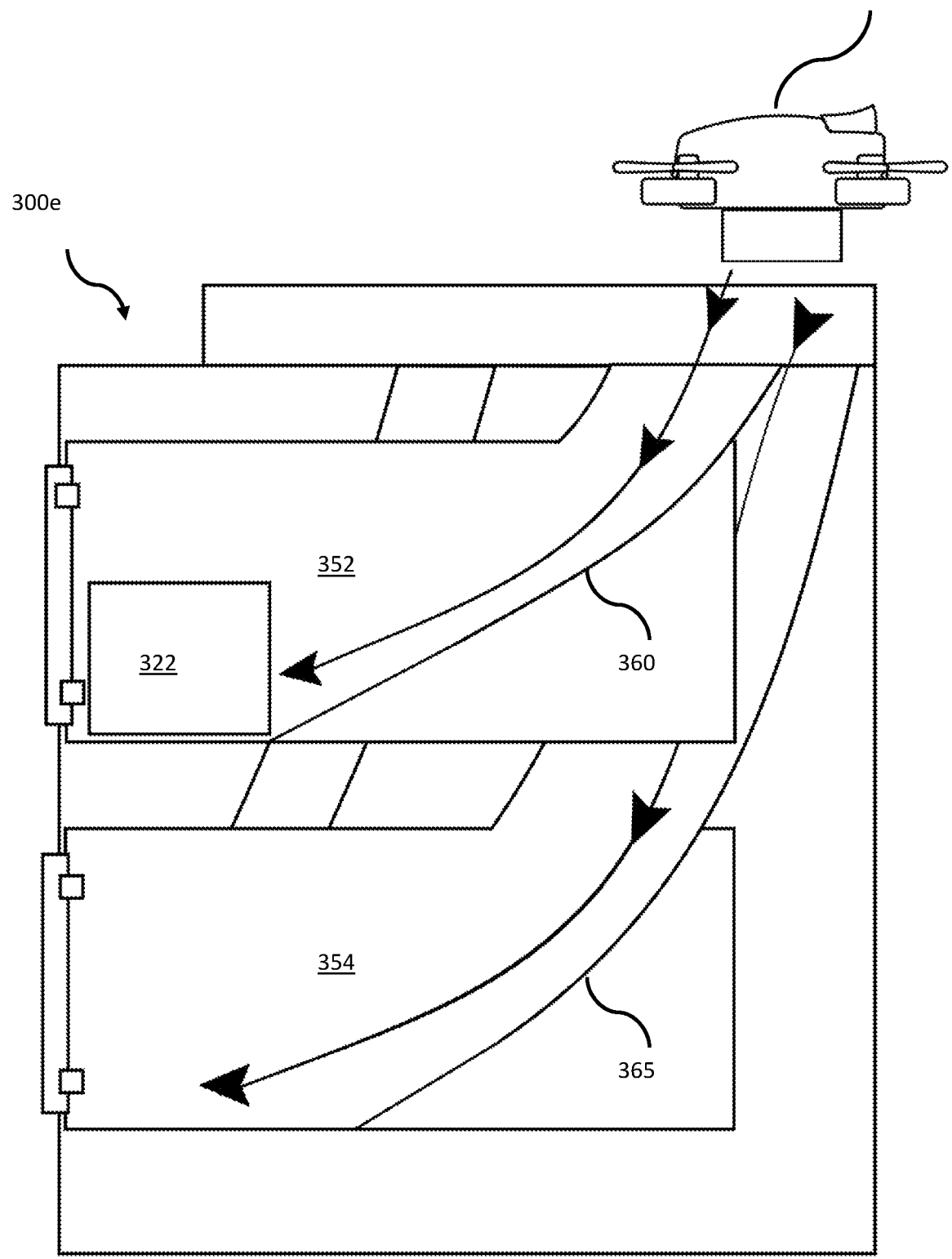
FIG. 22E is a side-cutaway view showing paths for a parcel to enter various vaults in a multi-vault landing pad according to some embodiments.

FIG. 22E shows multi-vault landing pad 300e having at least two vaults. In this system, parcel 322 has been deposited on the landing pad by unmanned aerial vehicle 318. Parcel 322 has been directed down ramp 360 into vault 352. Parcel 322 can be directed to the correct ramp by being dropped in a specific location on multi-vault landing pad 300e. Alternatively, parcel 322 can be identified by various methods and directed down the correct ramp, either 360 or 365 to the correct vault, 352 or 354 respectfully.

Landing Pads with Various Style Doors

Figure 23A:
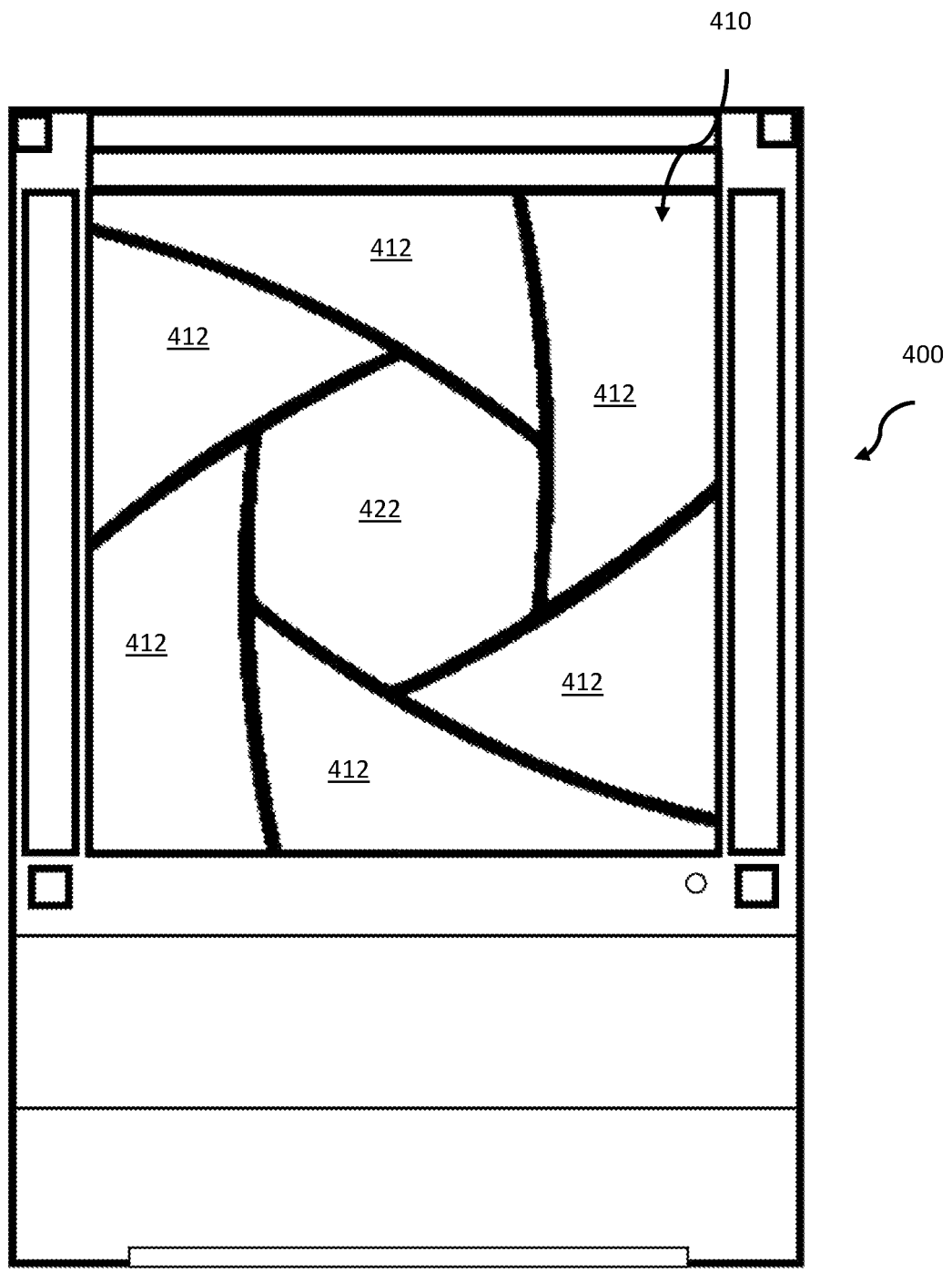
FIG. 23A is a top view of a multi-part diaphragm door on a landing pad according to some embodiments.

FIG. 23A shows landing pad 400 with multi-part diaphragm 410, that operates similarly to a camera iris. The design displayed has six blades 412 opening to aperture 422 on landing pad 400. One advantage of a multi-part diaphragm 410 is the ability to control the size of an aperture to receive a parcel. In this way, foreign objects (such as birds and rain) are impeded, if not prevented, from entering the interior compartments of landing pad 400.

Figure 23B:
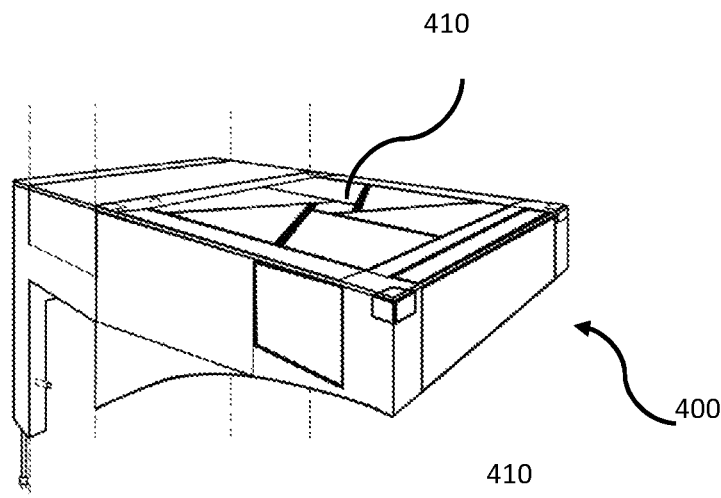
FIGS. 23B, 23C and 23D are a series of side perspective views of the landing pad of FIG. 23A showing the opening of the multi-part diaphragm door.
Figure 23C:
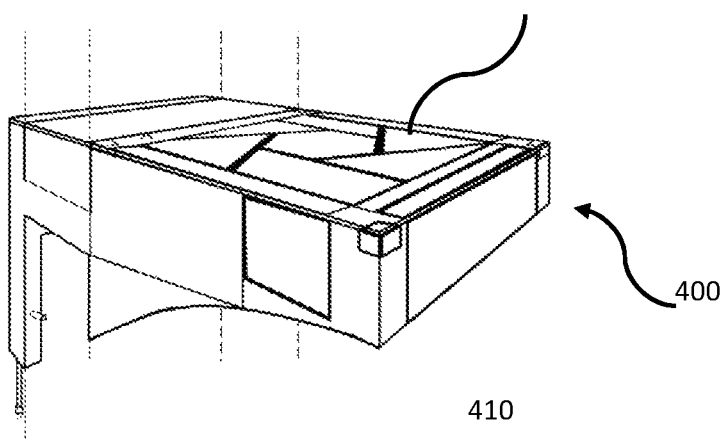
Figure 23D:
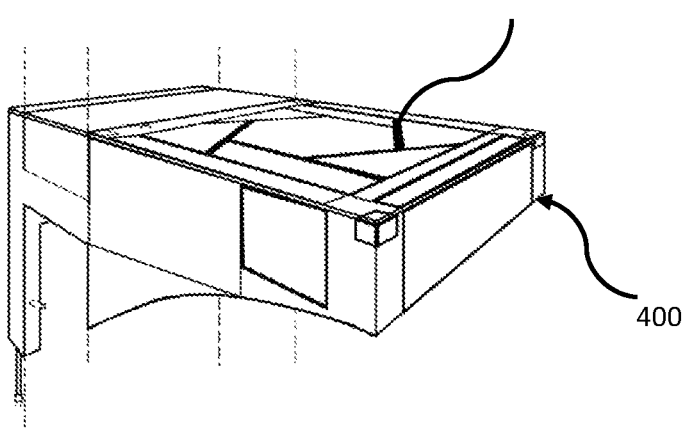

FIGS. 23B, 23C and 23D show landing pad 400 with multi-part diaphragm door 410 in different stages of opening.

Figure 33A:
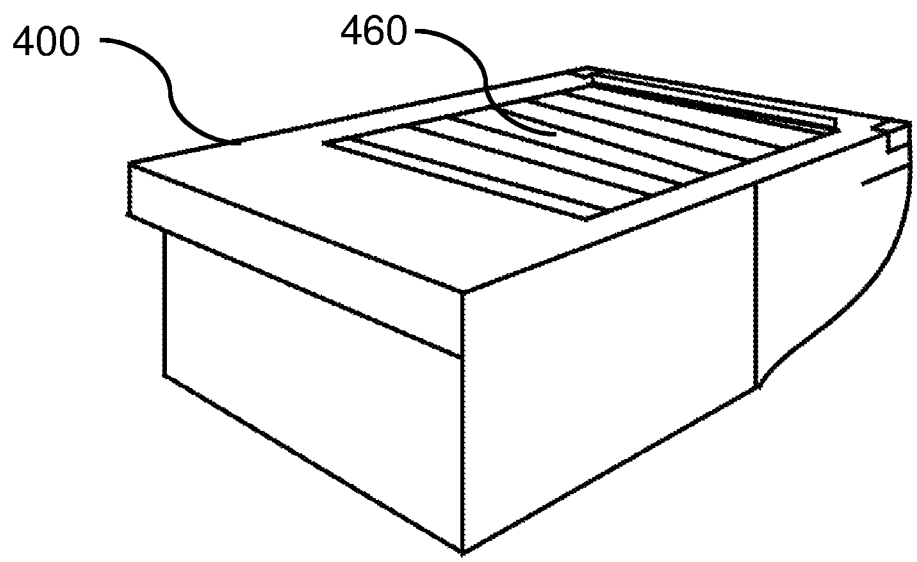
FIG. 33A and FIG. 33B are perspective views of a landing pad with a tambour door.
Figure 33B:
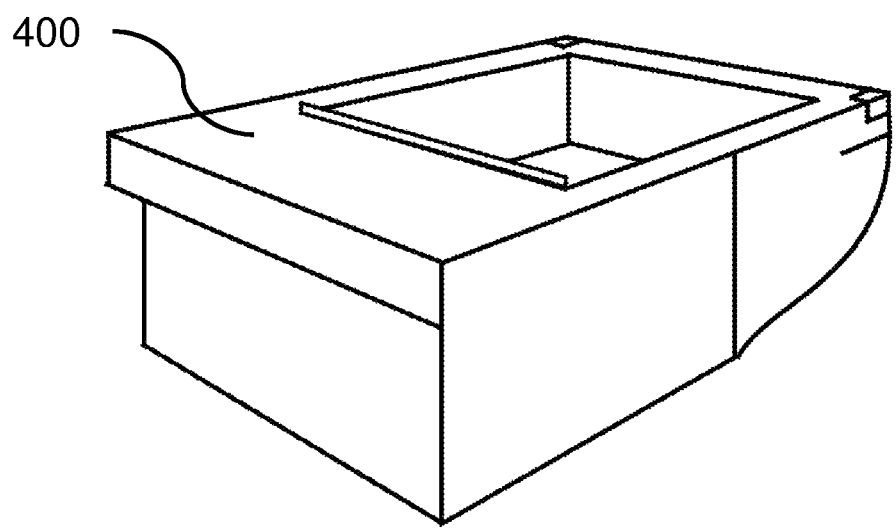

In some embodiments, such as those illustrated in FIG. 33A and FIG. 33B, landing pad 400 can utilize tambour door 460. In some embodiments the tambour door has a debris clearing lip configured to push water, debris, and/or the like that can accumulate on the landing pad.

Landing Pads Configured to Rotate into a Building

FIGS. 24A-24C show a hideaway landing pad 500 configured to rotate out of a structure. Hideaway landing pad 500 in FIGS. 24A-24C has solid platform 512, although various embodiments of landing pads, including those incorporating trap doors, multi-part diaphragms, and extending platforms can be converted to hideaway landing pads to increase security. Hideaway landing pad 500 is shown first in FIG. 24A, in a position wherein the back of the rotating panel 510 is sitting flush with the outer wall of a structure. Panel 510 rotates on bearings indicated at 516. FIG. 24B shows the rotating action of hideaway landing pad, wherein panel 510 revolves in the direction of arrows 518. In some embodiments, hideaway landing pad 500 can rotate 360 degrees. In other embodiments, hideaway landing pad 500 can only rotate 180 degrees.

FIG. 24C shows hideaway landing pad 500 after the revolving action, wherein hideaway landing pad 500 now sits outside of the structure. After receiving a parcel from a drone and/or delivering a parcel to a drone, the revolving action can be completed in reverse, thusly hiding the landing pad and making the overall system more secure.

Figure 25A:
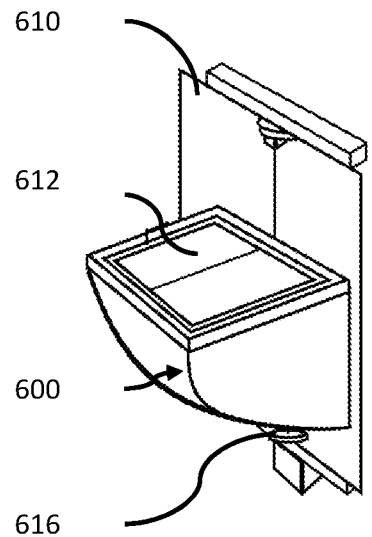
FIG. 25A is a side perspective view of a hideaway landing pad with a trapdoor.

FIG. 25A shows hideaway landing pad 600 having trapdoor 612 for receiving parcels. Landing pad 600 is affixed at its rear to rotatable panel 610. The rotatable panel in the displayed embodiment has symmetrical bearing systems 616 at its top and bottom, though other methods of allowing panel 610 to rotate can also be used.

Figure 25B:
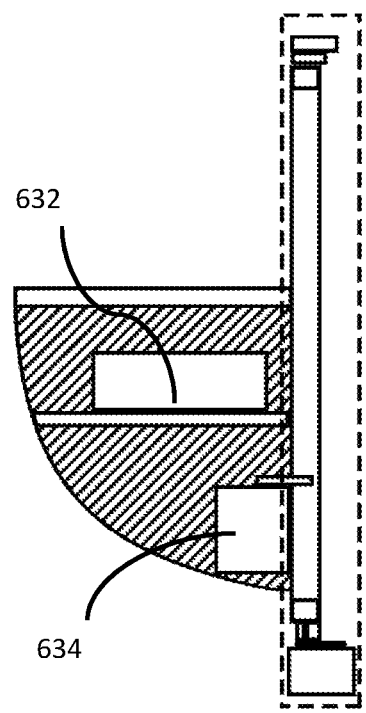
FIG. 25B is a cutaway side view of a hideaway landing pad with a trapdoor and a parcel located in the compartment.

A side view of hideaway landing pad 600 is shown in FIG. 25B, wherein the side panel of the landing pad has been made transparent, to show the inner workings of hideaway landing pad landing pad 600. In this illustration, parcel 632 is shown underneath trapdoor 612. Box 634 is also shown that can contain various electronic components including an array of sensors/scanners.

Figure 26A:
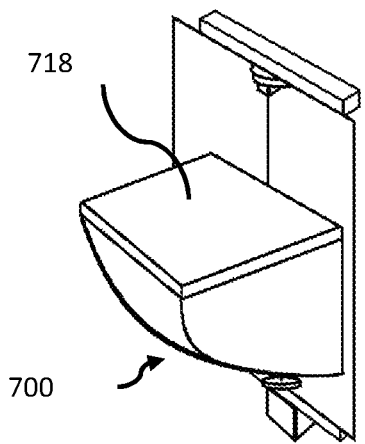
FIG. 26A is a side perspective view of a hideaway landing pad with a pad for parcel placement.
Figure 26B:
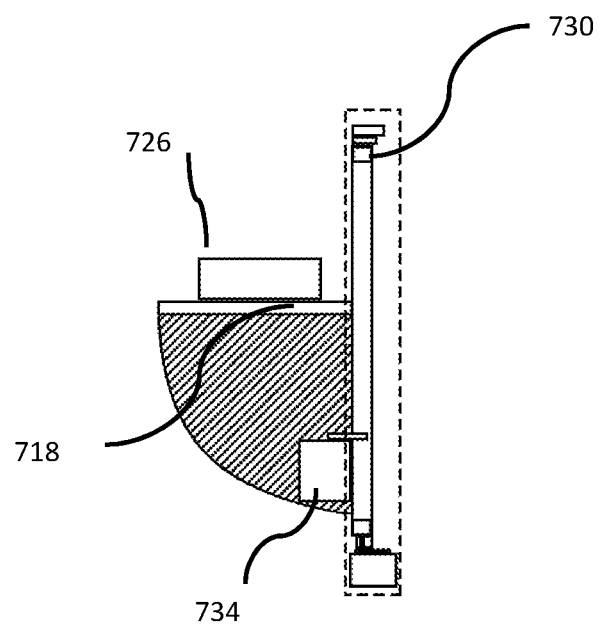
FIG. 26B is a cutaway side view of a hideaway landing pad with a parcel sitting atop a pad.

FIG. 26A shows a landing pad lacking a trapdoor system. In this embodiment, as FIG. 26B shows, the lack of trapdoor, means that parcel 726 sits on top of platform 718. Again, box 734 for electronics and sensors is shown in the bottom of landing pad 700. This box can be in a number of places, depending on the embodiment. While the illustrated embodiments show box 734 in the bottom of landing pad 700, in some embodiments, it is located immediately beneath the surface of the pad itself. FIG. 26B also shows a placement for a rear camera indicated by 730.

Figure 27A:
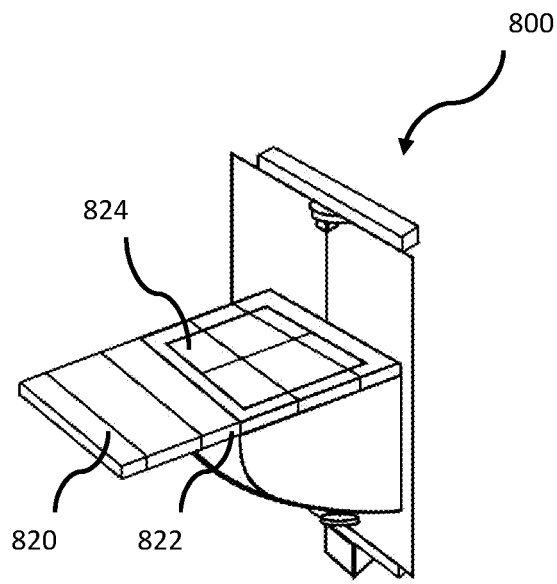
FIG. 27A is a side perspective view of a hideaway landing pad with a fold out landing pad extension.

FIG. 27A shows landing pad 800 with trapdoor 824 wherein landing pad 800 has a folding component. Creases 820 and 822 in the platform show where landing pad 800 can fold to save space, and to enable it to rotate and be hidden inside a building.

Figure 27B:
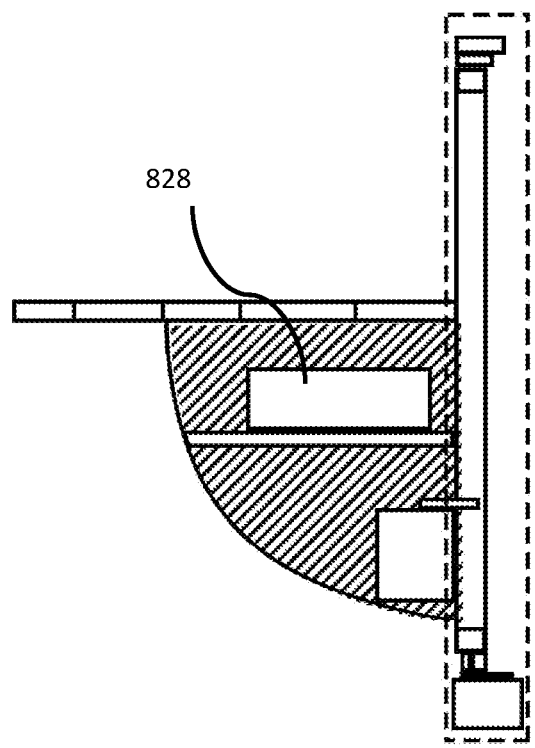
FIG. 27B is a cutaway side view of a hideaway landing pad with a parcel inside of the landing pad beneath a trapdoor, with a fold out landing pad extension.

FIG. 27B is a side view of landing pad 800. There is extra space provided on landing pad 800. In some embodiments, the extra space is used for large parcels that won't fit within trapdoor 824. The platform can extend various lengths, and while a folding method is shown, other methods of creating a retracting or extending pad are meant to be covered by this disclosure. In the displayed embodiment, parcel 828 is shown resting underneath trapdoor 824.

In some embodiments, a drawer can extend from the landing pad to receive a package for delivery and/or present a package for pickup. In at least some embodiments, the drawer does not have an upper surface.

Figure 28C:
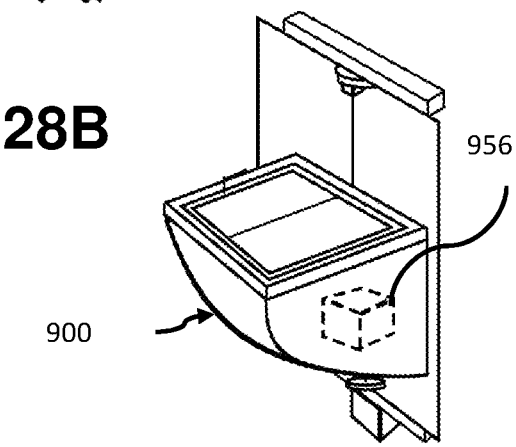
FIG. 28C is a side perspective view of a hideaway landing pad with a rechargeable battery.

FIGS. 28A-28C illustrate embodiments of landing pad 900 showing various power sources. FIG. 9A depicts power cord 950 extending from the rear of landing pad 900. FIG. 28B depicts solar panel 954 wired to a battery source 956 contained inside of landing pad 900. In some embodiments, external power sources are combined with alternative sources such as batteries and solar power. FIG. 28C depicts battery 956 in landing pad 900. Electrochemical methods, radiation absorption methods, and motion methods can be used to charge such sources.

Various mechanisms can be used for locating an unmanned aerial vehicle to actuate the rotating element, including detection by cameras, short range RFID techniques, Bluetooth or wireless network connectivity, geofencing techniques communicating with a GPS on board an unmanned aerial vehicle, and laser detection methods.

Hardware components of existing drone delivery systems allow for the physical delivery of parcels. However, these systems do not take into consideration logistical factors that impact fleets of drones (either owned by a single entity or multiple businesses) providing delivery to multiple parcel receptacles.

For example, in some embodiments individual businesses with at least one delivery drone can often make deliveries to the same receptacle. In other embodiments, businesses may outsource, at least some of their deliveries, to regional, national, and/or global distribution centers with a fleet of delivery drones that can make the deliveries. In either case, an interconnected drone delivery system (DDS) with a status determination system (SDS) would be helpful to coordinate deliveries to the individual parcel receptacles.

For example, in some embodiments, a DDS utilizing a SDS can tell if given parcel receptacle (such as a landing pad and/or mailbox) has the required and/or desired properties to accommodate a given parcel before dispatching a drone to make the delivery by considering factors such as the properties of the parcel(s) and acceptable parcel receptacles. In other or the same embodiments, a DDS with SDS can determine delivery capacity of a given drone, taking into account variables such as, but not limited to, the flight capabilities of drones (including energy storage) and potential flight paths (including the use of potential charging stations).

In at least some embodiments, the SDS can determine, among other things, if a given parcel receptacle is large enough to receive a given parcel, if the given parcel is currently filled with one or more parcels, if the given parcel receptacle is scheduled to receive another parcel before a given drone can deliver its parcel, if the given parcel receptacle has the ability to adjust its compartment to meet the minimum requirements of the parcel contents (for example humidity and/or temperature levels) and/or when the receptacle owner is scheduled to empty the receptacle. A SDS that can communicate this type of information to a DDS can optimize, or at least improve, drone delivery of parcels to parcel receptacles.

Figure 29:
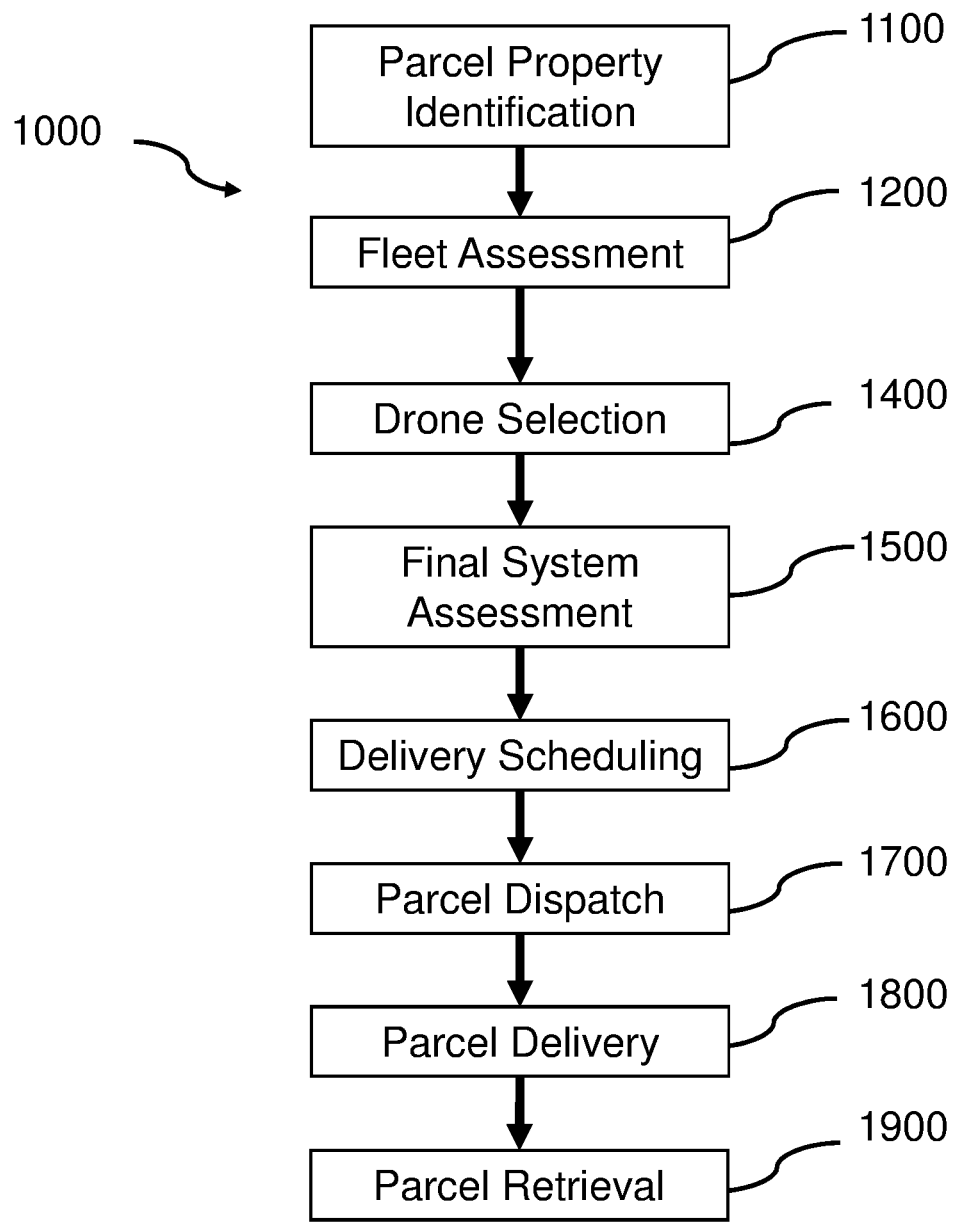
FIG. 29 is a flow diagram of a method for drone delivery utilizing a Status Determination System (SDS).

FIG. 29 illustrates an embodiment of method 1000 for drone delivery scheduling utilized by a DDS with a SDS. In method 1000, the status of at least one parcel, parcel receptacle, and/or drone is determined before the parcel is delivered At Parcel Property Identification 1100, Parcel Information about a to-be-delivered parcel is gathered and/or received by a SDS and relayed to the DDS to aid in scheduling a delivery. In some embodiments, Parcel Information is sent directly to the SDS/DDS by a shipper when the shipment is created. In other embodiments, at least some Parcel Information is gathered by the parcel delivery company when it receives the parcel. Parcel Information can include, among other things, the dimensions, weight, and/or volume of the parcel, and the contents of the parcel (including special requirements of the contents such as the minimal and/or maximum humidity and/or temperatures the contents can withstand).

Parcel Information can also include when the parcel will be ready for delivery and/or if the contents of the parcel are time sensitive.

Parcel Information can be used, either alone, or in conjunction with User Input, Receptacle Information and/or Drone Information by the DDS to make determinations on if/how/when to deliver the parcel to a given receptacle.

For example, a scheduling conflict can arise if Receptacle Information for a particular receptacle indicates that the receptacle is currently occupied by another already-delivered package. In some embodiments, the DDS can also take into account User Input from the SDS that the intended recipient has indicated that he is unable to remove the already-delivered package before the DDS was planning on delivering the given parcel. In these cases, the DDS can, among other things, reschedule the delivery, see if the intended recipient would accept delivery at another parcel receptacle, and/or offer to hold the parcel for pickup.

Receptacle Information can include, among other things, fixed information and time-dependent information. Fixed information can include, among other things: the make and model of the receptacle; the physical location of the receptacle including its altitude (in some embodiments this information is provided via GPS or other location methods); the receptacle's vault/compartment(s) specifications including dimensions/volume(s), the receptacle's weight restrictions (for both parcels and drones); and additional capabilities of the receptacle (such as thermal control, sensor capabilities, trapdoors, and/or aperture openings).

Fixed information can also include information pertaining to drone verification systems, current firmware/software versions of the receptacle, as well as system settings and the receptacle's last scheduled maintenance.

Fixed information can also include an owner/user's preferences. These preferences can be entered in an individual/receptacle profile and tied to a location or address, as well as an individual, group of users or organization. In some embodiments, this information can also be associated with a user account or user profile.

User accounts/profiles can be particularly helpful in embodiments when parcel receptacles are utilized and accessible by multiple people. In some of these embodiments, the SDS can determine if the parcel to be delivered to a shared receptacle requires a secured retrieval from the intended recipient (as is often the case with certified mail or legal documents). In some of these embodiments, the DDS can transmit to the receptacle the intended recipient's profile for retrieval, such that the receptacle requires the intended recipient (or his agent) to receive the documents via a key, password, visual identification, and/or the like.

In some embodiments, fixed information is provided when a receptacle owner/user registers/connects the receptacle to a network. In some embodiments, the network is run by a single delivery company, in other embodiments the network is shared by multiple delivery companies.

In at least some embodiments, fixed information can be changed, for example if the receptacle is physically moved and/or modified.

Time-Dependent information can include, among other things, the current capacity of the receptacle (for example how much room is currently available in its vault after taking into consideration already delivered packages), the current thermal status of the receptacle, and whether that status can be modified or if a currently delivered package requires the current status.

At Fleet Assessment 1200, the DDS uses Parcel Information, User Input, Drone Information, and/or Receptacle Information provided by the SDS to determine which drone(s) within the fleet is/are capable of delivering the parcel to the intended parcel receptacle. Drone Information considered can include, among other things, the current location of the drone, the physical limitations of the drone, the current energy status of the drone (for example does it have a fully charged battery and/or full tank of gas), and current schedule.

In some embodiments, multiple parcel receptacles can be considered. This is particularly likely when a parcel receptacle is located in an apartment complex and/or a multi-tenant commercial building.

In some embodiments, the SDS can determine if the drone has the requisite energy needs to make a delivery with the location specified in a User Profile or Receptacle Profile on the SDS. In at least some embodiments, this calculation is based on the flight routes and calculated distance of those routes. This serves to narrow the pool of available to drones to those most capable of completing the delivery.

At Drone Selection 1400 the DDS determines which drone (from the group defined in Fleet Assessment) should make the delivery. This is accomplished using information, such as, but not limited to, Parcel Information, User Input, Drone Information, and/or Receptacle Information. The SDS/DDS can also consider, among other things, whether there are charging stations along a path a given drone might take; and other packages that might be being delivered to the receptacle. The DDS then, often via a system of algorithms that prioritize various factors, selects a drone to complete the delivery. In at least some embodiments, the determination is made based on minimizing or maximizing at least one factor. For example, in some embodiments a drone is selected based on it being the smallest drone capable of delivering the parcel. In other embodiments, a drone can be selected based on the fact that using said drone minimizes the amount of time required to make the delivery.

At Final System Assessment 1500, the SDS/DDS runs a final check to determine whether or not to send the selected drone with the parcel to the receptacle. Final System Assessment 1500 is often conducted as there can be a time gap between a drone being selected for use and it actually picking up the package. In some embodiments, the DDS can reschedule a drone delivery if new information indicates a given factor has changed. In some embodiments, the DDS will only reschedule a delivery if a given factor has changed beyond a certain threshold (for example a new delivery option will save the delivery company a given amount of money or will result in the parcel being delivered a given amount of time sooner).

In at least some embodiments, the DDS has the ability to reroute drones mid-delivery.

At Delivery Scheduling 1600, the DDS schedules the path the drone will take to the receptacle including expected delays and stops. Route scheduling is often conducted during Drone Selection 1400, but in many embodiments is also recalculated immediately before the drone leaves with the package to take into account factors (such as changes in the weather) that can require rerouting.

In some embodiments, the DDS/SDS assesses flight paths and potential choke points while scheduling deliveries using information such as, but not limited to: when the parcel will be picked up by the drone; current deliveries being conducted; estimated time of return of given drones; queued deliveries the parcel receptacle(s) is/are involved in; whether the drone is expected to charge along the route; and/or if the drone is expected to charge at the parcel receptacle (assuming the parcel receptacle allows charging).

In some embodiments, the SDS/DDS can also take into account applicable weather and meteorological data to determine its route. If the parcel receptacle is fitted with meteorological sensory equipment, it can transmit this information to the system, along with other parcel receptacles en route. This can allow the SDS to determine whether delays should be scheduled to avoid inclement weather or other hazards.

In embodiments with charging stations, such as those in which parcel receptacles can double as charging stations, the DDS can credit users for participating in the network. For example, in some embodiments if a drone wirelessly charges at a parcel receptacle, the DDS can credit the owner of the parcel receptacle based on a specified rate. Often this credit can be applied via the User's account.

At Parcel Dispatch 1700, the selected drone picks up the package and begins on the path laid out at Delivery Scheduling 1600 to the receptacle.

At Parcel Delivery 1800, the selected drone drops off the package at the receptacle.

At Parcel Retrieval 1900 a receiving individual retrieves the parcel after delivery.

In at least some embodiments, a delivery system can comprise, among other things, at least one parcel receptacle, at least one parcel, and at least one delivery drone.

In some embodiments, various parts of the DDS such as individual drones and/or parcel receptacles can be in an either active or passive state. For example, in some embodiments, a parcel receptacle can operate in a passive state in which the receptacle is on standby but has internet connection or some other means of communication with the DDS. In these embodiments, the parcel receptacle is not in use, but remains powered and connected to the DDS. In some embodiments, this allows the DDS to systematically assesses the real-time capabilities of the DDS.

In some embodiments, a parcel receptacle operating in passive state sends minimal, if any, status updates to a central server. This reduces power usage. It also reduces traffic on communication systems. In some embodiments, when a user places an order destined for a given parcel, the parcel receptacle enters an active state. In some embodiments, this signals the start of a new delivery within the DDS.

The central server is a cloud server which, in some embodiments, can be used to keep costs down. In some embodiments, a cloud server allows companies to monitor deliveries en route and/or communicate with their clients or vendors.

In some embodiments, the parcel enters an active state after Parcel Property Identification 1100.

In some embodiments, the DDS includes a central server or network of connected servers which process data input to the system. In at least some embodiments, the central server has an operator. In some embodiments, the operator of the central server can be a third party.

In some embodiments, the SDS can be linked to a means of payment as well, such as a credit card or online payment portal. In some embodiments, this information can be linked to the user and/or the receiving location. In some embodiments, a unique code or system identification number can be assigned to each profile as well, to improve delivery security.

In some embodiments, the SDS can determine if the parcel receptacle is involved in another delivery with a drone tied to the DDS and/or with a drone outside the DDS. In cases where the receptacle is involved with another delivery, the SDS can determine (via an analysis of projected flight paths and projected landing times) whether the proposed delivery creates unnecessary risk of the drones colliding. In such cases, the proposed delivery can be delayed or queued until the risk/conflict is mitigated or averted. In some embodiments, the proposed delivery can be cancelled if certain criteria are met, such as the risk of collision being too high and/or if the queue is not cleared within a specified timeframe.

In some embodiments, the DDS/SDS can determine, among other things, if concurrent or simultaneous deliveries proceed and whether the volume or storage capabilities of a given parcel receptacle can handle the multiple deliveries. In some embodiments, DDS/SDS consider information regarding parcels that have not been removed from the parcel receptacle and are thus taking up space in the receptacle. In at least some embodiments, Parcel Information such as weight, dimensions, volume, contents, and fragility of a parcel can be used to determine if multiple deliveries can continue or if one delivery should conclude before another can begin. In some embodiments, parcel receptacles can accommodate multiple parcels and the SDS/DDS can determine this.

In some embodiments, a concurrent/simultaneous delivery is not limited to two drones delivering separate orders with overlapping flight times. For example, if a first parcel is still in the receptacle and hasn't been picked up, that delivery can still be considered active, such as the embodiment shown in FIG. 29. In these embodiments, a delivery is initiated when an order is placed and the delivery concludes when the intended recipient opens the parcel receptacle and retrieves the parcel. In other embodiments, deliveries are deemed complete when the drone arrives to its location of origin, or begins another delivery subsequently. In at least some of such embodiments, the parcel receptacle goes from active to passive states once the delivery concludes and the parcel is retrieved.

In some embodiments, the user may decide to return one or more items to the deliverer. In some such embodiments, the DDS/SDS can determine if the pickup of the to be returned item(s) would conflict with currently unretrieved packages and/or prior scheduled incoming deliveries and/or pickups.

In some embodiments, the DDS can determine if deliveries have conflicting requirements accordingly. In the case of temperature controlled parcel receptacles, information from the SDS can be used in determining if the concurrent deliveries are viable. For instance, if a meal has yet to be retrieved from the parcel receptacle, and is being kept warm by an internal warming function; a medicine that should be refrigerated should not be delivered. In these cases, the DDS can hold the delivery or reroute it to another receptacle.

According to some embodiments, the DDS/SDS can determine if a parcel receptacle has wireless charging capabilities and utilize these capabilities for charging the drone.

In some embodiments, parcel receptacles en route can be activated temporarily to allow drone charging along routes in order to earn credit or compensation. In some embodiments, the DDS takes this information into account when calculating the route, fly time, estimated time of delivery, etc.

Figure 30:
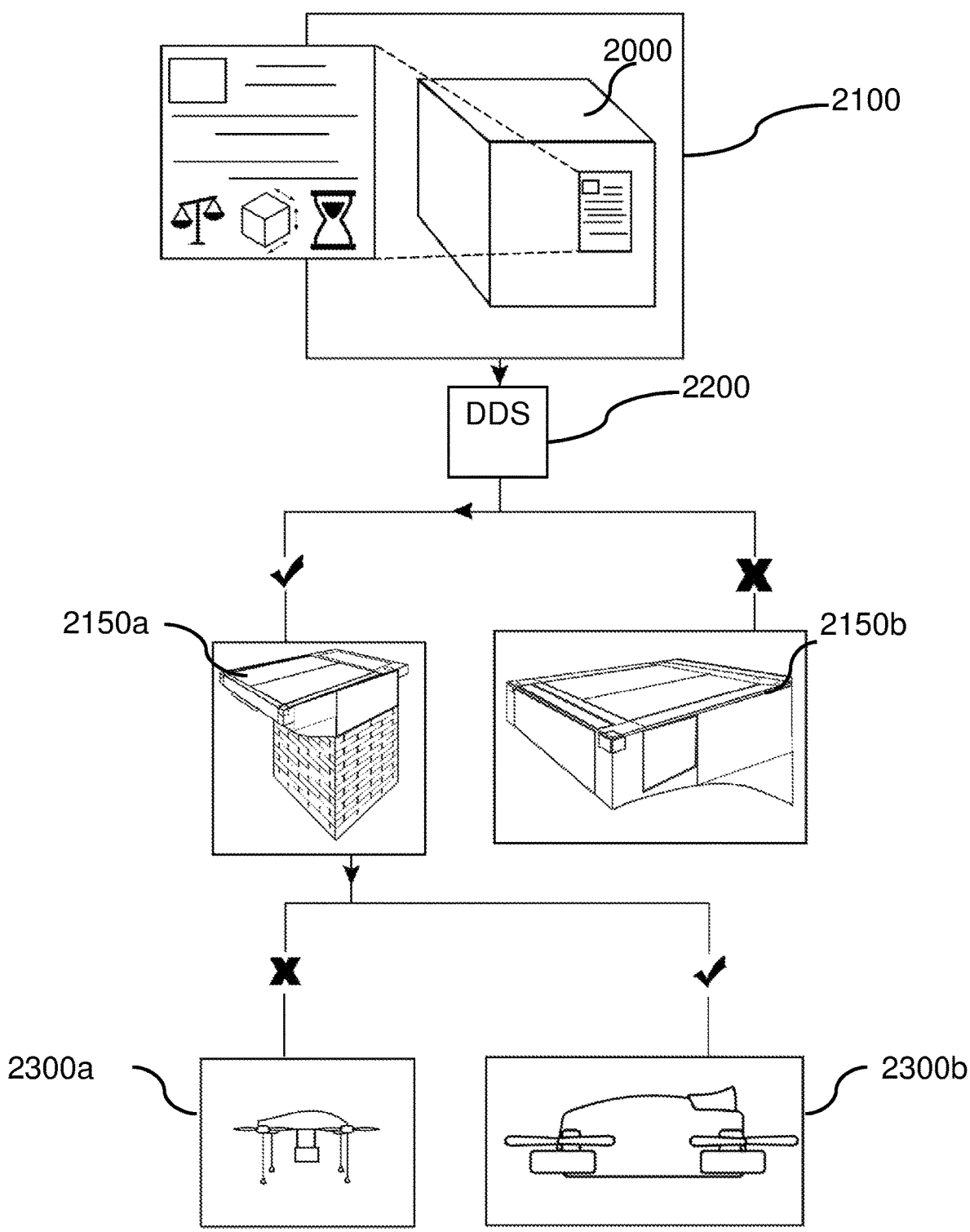
FIG. 30 is a flow diagram of drone and parcel receptacle selection according to one embodiment.

FIG. 30 illustrates an example of a drone delivery system making determinations based on a DDS with a SDS.

At 2100, parcel information such as the weight and dimensions of parcel 2000 is gathered by the SDS.

At 2200, this information is then sent to the DDS.

The DDS then uses that information to decide what type of parcel receptacle (2150*a* or 2150*b*) can accommodate parcel 2000 based on the parcel information obtained at 2100. In the illustrated example, the DDS determines, based on Receptacle Information provided by the SDS that parcel 2000 should be delivered to a reinforced receptacle such as pad 2150*a*.

The DDS then uses the Parcel Information and/or Receptacle Information to determine what type of drone should be used to carry parcel 2000. If parcel 2000 is large and/or heavy, certain drones with a higher load capacity are selected by the SDS, such as high capacity drone 2300*a*. Otherwise, the SDS determines other drones such as drone 2300*b* can be used, keeping high capacity drone 2300*a* free for other deliveries.

The DDS can, in some embodiments, be used for retrieval of parcels from an end user's receptacle. In some embodiments, the DDS working with SDS can coordinate the retrieval of a parcel from the user's receptacle by determining the time and selecting the optimal drone for pick up in the same or similar manner as if it were coordinating delivery from a central location.

In some embodiments, the drone retrieving the parcel could be on a return route after completing an outbound delivery. The SDS and DDS can coordinate multiple deliveries for a drone fleet to allow, among other things, deliveries from central locations to receptacles, receptacles to return parcels to the retailers, and/or deliveries between user receptacles.

It will be understood that distinctions between the DDS and SDS is optional and often used for explanatory purposes. Actions taken by the DDS can be performed by the SDS and vice versa. In some embodiments, a single DDS performs all of the actions/steps described above.

Figure 31:
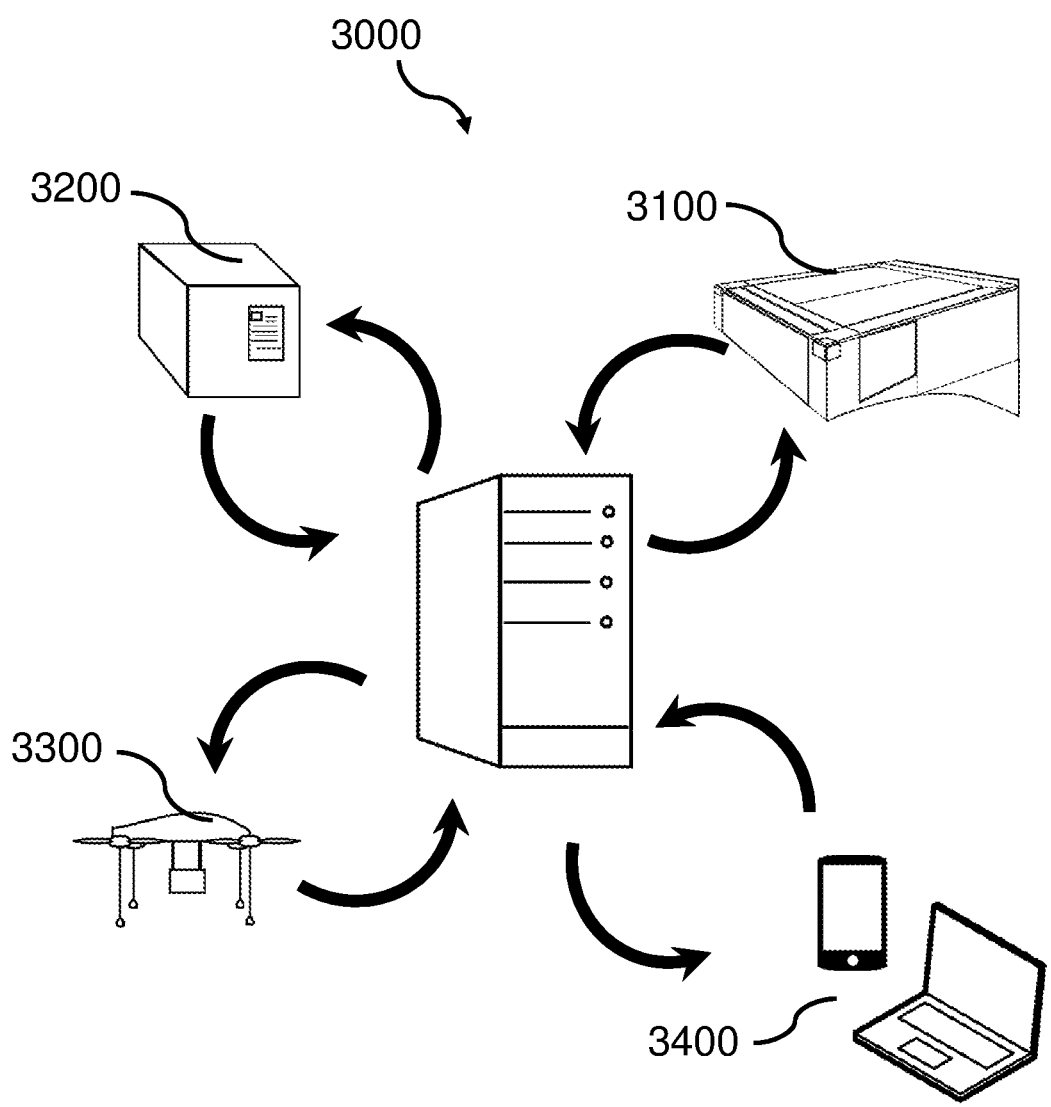
FIG. 31 is a schematic diagram showing an example embodiment of a drone delivery system.

FIG. 31 shows an example DDS 3000. In the shown embodiment, Particle Receptacle 3100, Parcel 3200, Drone 3300, and User/Recipient 3400 are in direct communication with a central processor. In some embodiments Particle Receptacle 3100, Parcel 3200, Drone 3300, and/or User/Recipient 3400 can also communicate directly with each other.

Figure 32A:
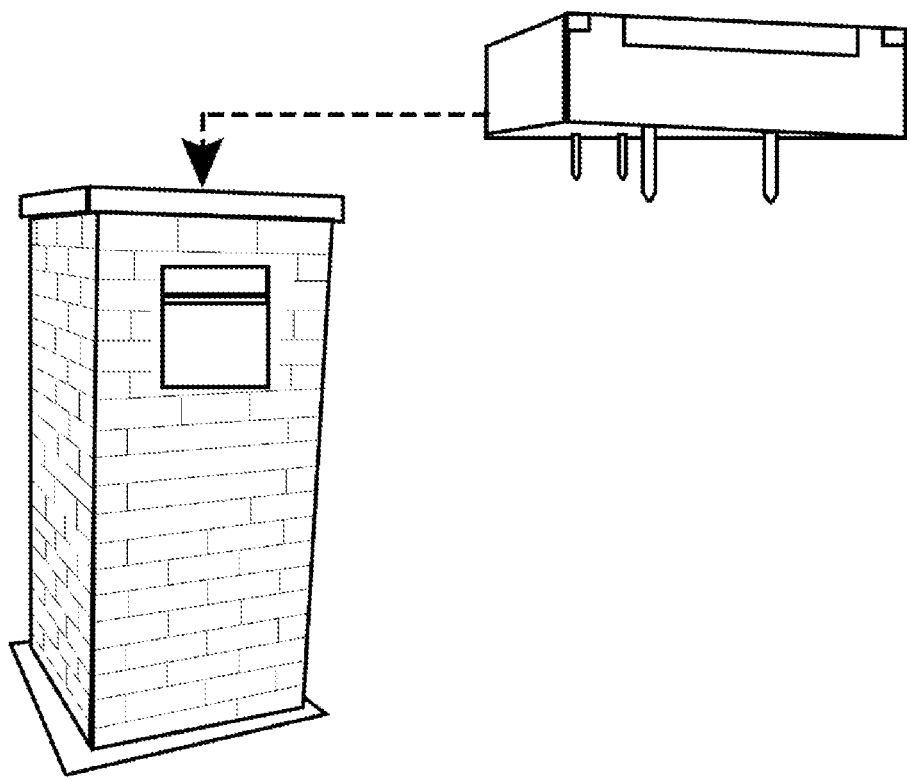
FIG. 32A and FIG. 32B are perspective views of a landing pad being installed on a conventional mailbox.
Figure 32B:
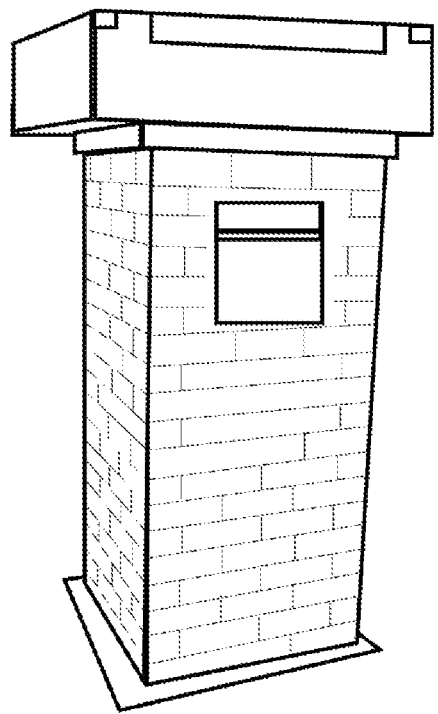

In some embodiments, such as those illustrated in FIG. 32A and FIG. 32B, the landing pad utilizes a mailbox system to mount the pad to existing mailboxes.

Figure 34A:
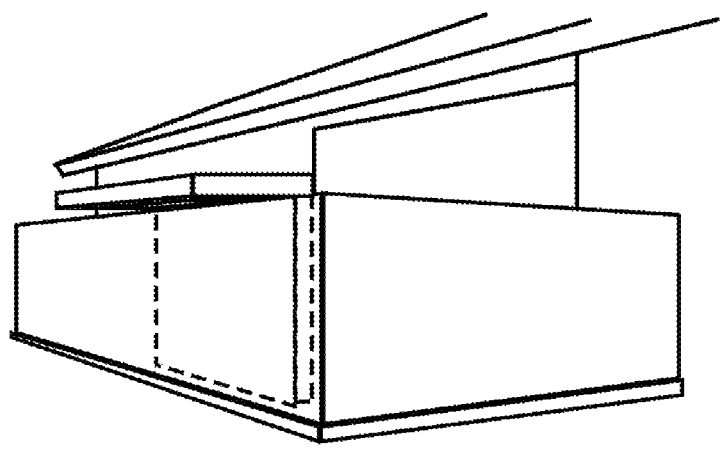
FIG. 34A is a perspective view of a landing pad attached to a balcony according to one embodiment.
Figure 34B:
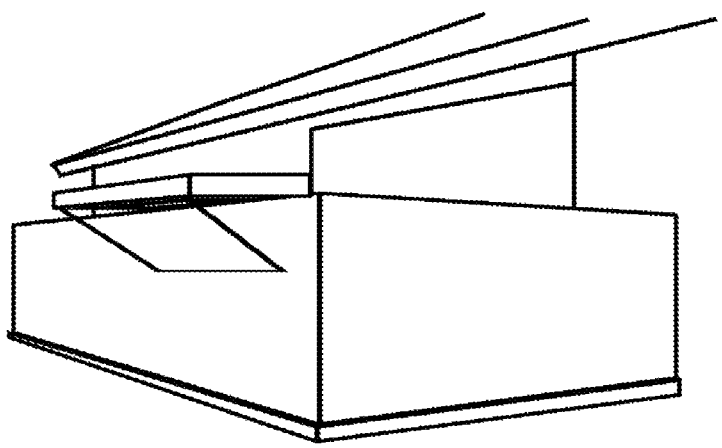
FIG. 34B is a perspective view of a landing pad attached to a balcony according to one embodiment.
Figure 34C:
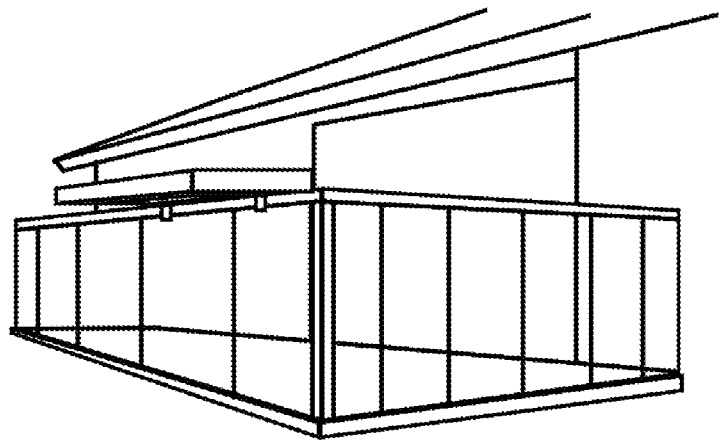
FIG. 34C is a perspective view of a landing pad attached to a balcony according to one embodiment.
Figure 35:
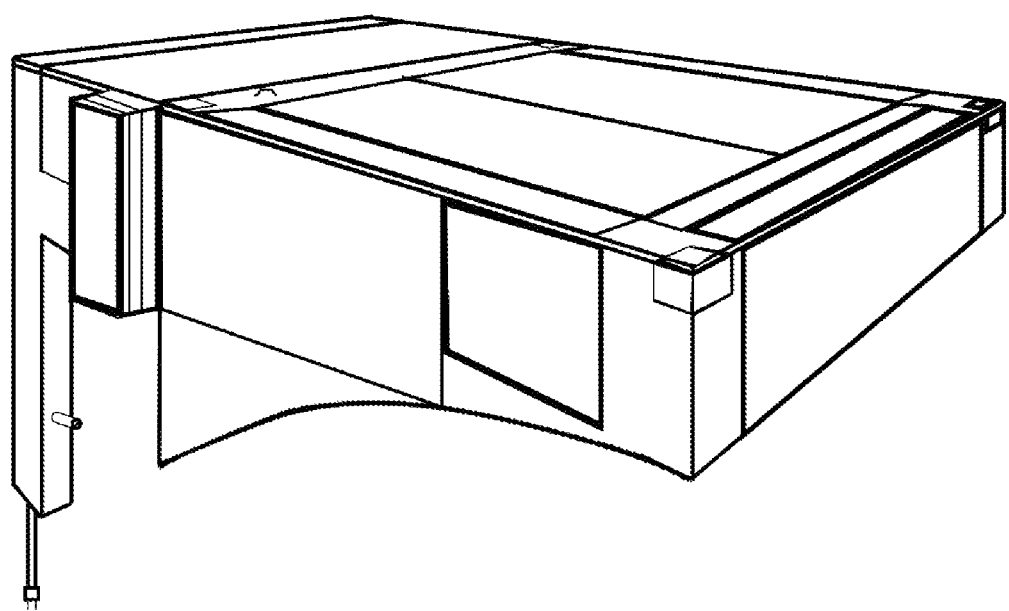
FIG. 35 is a perspective view of a landing pad configured to be attached to a window with expanding gap-filling wings.

In some embodiments, such as those illustrated in FIG. 34A-34C, the landing pad utilizes a balcony mounting system that utilizes a balcony brace and/or a balcony mount. In some embodiments, the landing pad can be secured to the floor and/or lower surface of the balcony. In some embodiments, the landing pad can be secured to the banister, guardrail or railing of the balcony. In some embodiments, the landing pad can be attached and/or supported to the outer exterior surface of the balcony.

While particular elements, embodiments and applications of the present invention have been shown and described, it will be understood, that the invention is not limited thereto since modifications can be made without departing from the scope of the present disclosure, particularly in light of the foregoing teachings.

Additionally, it will be understood that the order of steps recited above, could be interchanged and remain within the scope of the invention. Additionally, in various embodiments, entire steps can (and often are) removed and the resulting methods would still be in the scope of the present invention.

What is claimed is:

1. A landing pad comprising:
    (a) a landing platform;
    (b) a storage compartment, wherein said landing platform comprises a door in a normally closed position which when open exposes the interior of said storage compartment;
    (c) a storage compartment door, wherein said storage compartment door is attached to said storage compartment;
    (d) a storage door lock, wherein said storage door lock is configured to bias said storage door in a closed position;
    (e) a transmitter capable of emitting a signal; and
    (f) a rotating hideaway mechanism, wherein the landing pad is inside of a structure in a first position, and wherein said landing pad is rotated about an axis to be exposed to the outside of the structure in a second position, wherein the rotating hideaway mechanism is actuated from the first position to the second position when a first camera detects an incoming unmanned aerial vehicle.

2. The landing pad of claim 1 further comprising:
    (g) at least one scanner.

3. The landing pad of claim 1 further comprising:
    (g) said first camera; and
    (h) a second camera, wherein said second camera is located in said storage compartment.

4. The landing pad of claim 3 further comprising:
    (i) a third camera, wherein said third camera is located on the rear of said landing pad.

5. The landing pad of claim 3 wherein said door is a multi-part diaphragm door, wherein said door opens to different dimensions depending on a size of an incoming parcel.

6. The landing pad of claim 1 further comprising:
    (g) a multi-vault system, having a plurality of vaults therein, wherein an incoming parcel can be stored in a first vault selected from the plurality of vaults, wherein said first vault is kept at a different temperature than a second vault selected from said plurality of vaults.

7. The landing pad of claim 6 further comprising:
    (h) an RFID detection system interfacing with a RFID tag on an incoming parcel, such that the RFID detection system can read the RFID tag to identify which vault to store said parcel in.

8. The landing pad of claim 6 further comprising:
    (h) a camera detection system interfacing with known markings on an unmanned aerial vehicle, such that identification of the unmanned aerial vehicle allows the multi-vault system to open the first vault in which said incoming parcel carried by said unmanned aerial vehicle is to be stored.

9. The landing pad of claim 1 wherein said landing pad is configured to be placed in a window of a residence, wherein said landing pad is configured to fold into said window when not in use.

10. The landing pad of claim 1 further comprising:
    (g) an LED screen configured to display a specific visual code that can be verified algorithmically by a drone.

11. The landing pad of claim 1 wherein said first camera is configured to scan a parcel for information about said parcel.

12. The landing pad of claim 1 further comprising:
    (g) a screen for displaying a user interface.

13. The landing pad of claim 1 wherein said landing pad acts as a charging station for a drone, wherein said landing pad utilizes inductive charging.

14. The landing pad of claim 1 further comprising:
    (g) a sensor, wherein said sensor measures one of an exterior temperature, a wind direction, a wind speed, and a barometric pressure.

15. The landing pad of claim 14 wherein said landing pad is configured to communicate with a second landing pad and use information measured by said sensor and a second sensor located on said second landing pad to map a weather pattern.

16. The landing pad of claim 1 further comprising:
    (g) a thermal heat conducting mechanism configured to melt an amount of snow on the top of said landing pad.

17. The landing pad of claim 14 further comprising:
    (h) a thermal heat conducting mechanism configured to turn on based on information from said sensor.

18. The landing pad of claim 1 further comprising:
    (g) a display panel on an exterior facing surface of said landing pad, wherein said landing pad communicates with a second landing pad with a second display panel to create a visual design.

* * * * *